May 5, 1953  A. J. FETTIG  2,637,494
AMOUNT ENTERING MEANS FOR ACCOUNTING MACHINES
Filed March 24, 1950  10 Sheets-Sheet 1

INVENTOR.
Arthur J. Fettig
BY Fidler, Crouse
+ Beardsley

May 5, 1953  A. J. FETTIG  2,637,494
AMOUNT ENTERING MEANS FOR ACCOUNTING MACHINES
Filed March 24, 1950  10 Sheets-Sheet 5

INVENTOR.
Arthur J. Fettig
BY Fidler, Crome
+ Beardsley

May 5, 1953  A. J. FETTIG  2,637,494
AMOUNT ENTERING MEANS FOR ACCOUNTING MACHINES
Filed March 24, 1950  10 Sheets-Sheet 6
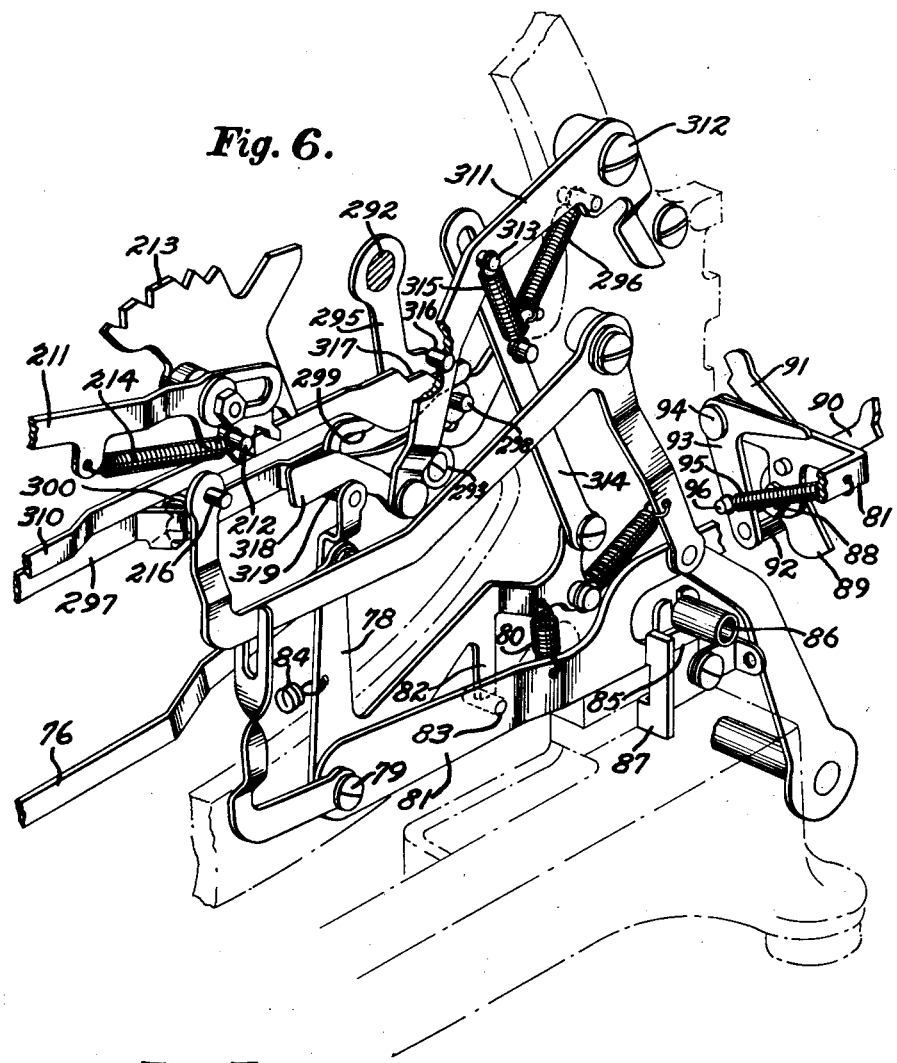
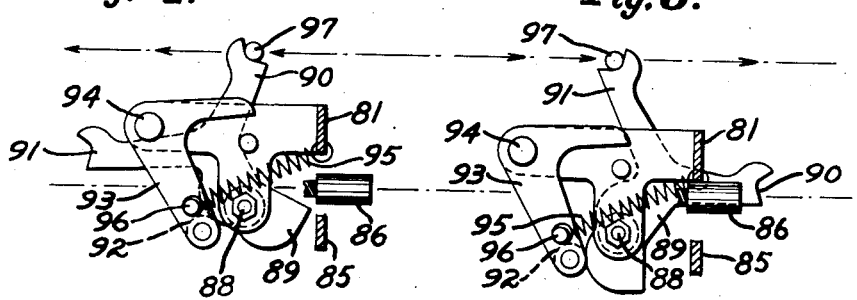
INVENTOR.
Arthur J. Fettig
BY Fuller, Crome & Beardsley May 5, 1953  A. J. FETTIG  2,637,494
AMOUNT ENTERING MEANS FOR ACCOUNTING MACHINES
Filed March 24, 1950  10 Sheets-Sheet 7

INVENTOR.
Arthur J. Fettig
BY
Fidler, Crome
+ Beardsley.

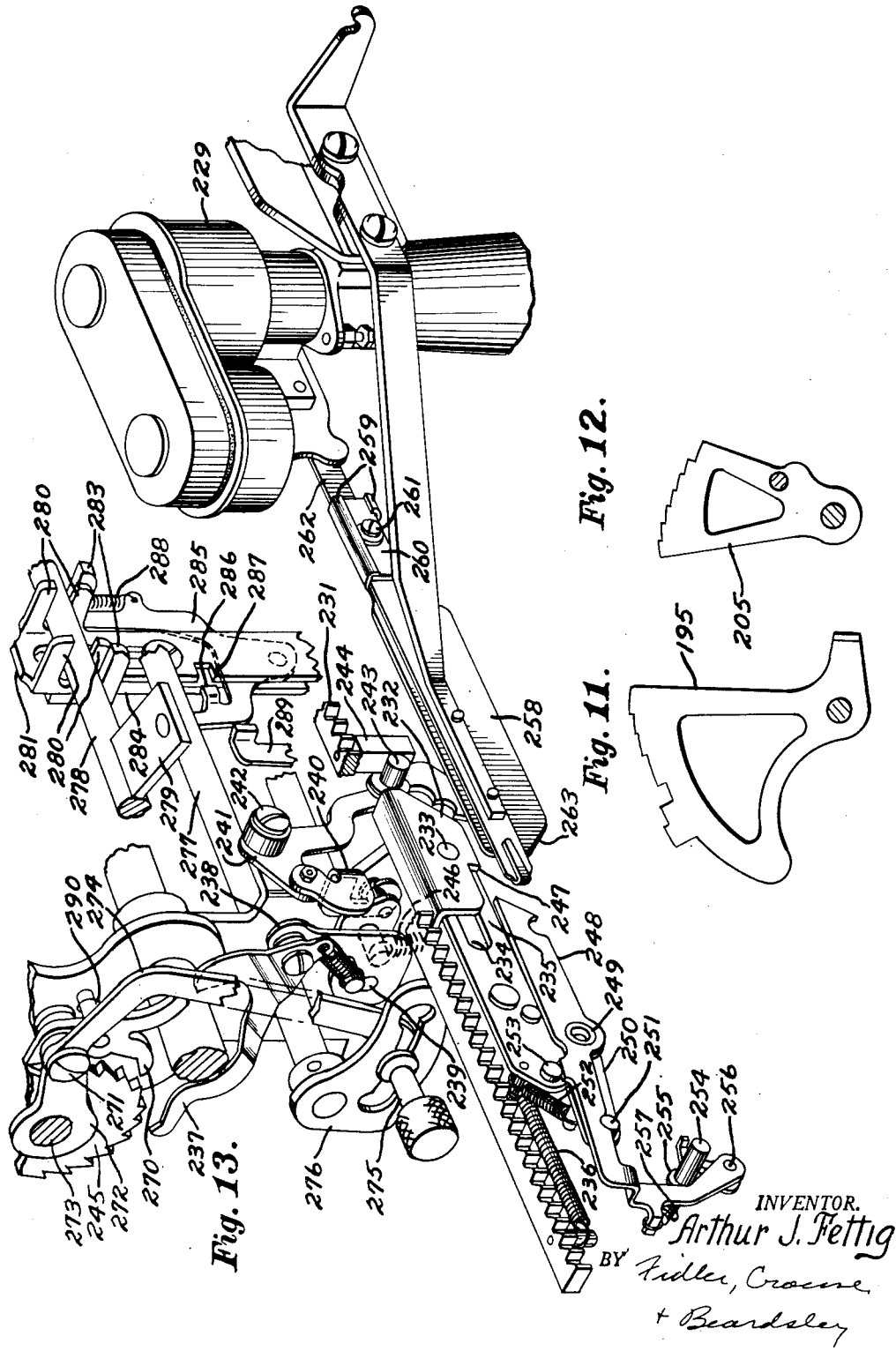

May 5, 1953  A. J. FETTIG  2,637,494
AMOUNT ENTERING MEANS FOR ACCOUNTING MACHINES
Filed March 24, 1950  10 Sheets-Sheet 10

| | OLD BAL. | CHECKS | FEES | DEPOSITS | DATE | NEW BALANCE |
|---|---|---|---|---|---|---|
| | | | | | Oct 31'49 | 200.00* |
| 1. | 200.00 | 11.00- | .05- | | | |
| 2. | | 55.00- | .30- | | | |
| 3. | | | .25- | 35.00 | Nov 1'49 | 168.40* |
| 4. | 168.40 | | .75- | 174.55 | Nov 4'49 | 342.20* |
| 5. | 342.20 | 150.00- | .15- | | | |
| 6. | | 14.85- | .05- | | | |
| 7. | | | .25- | 50.00 | | |
| 8. | | | .25- | 25.00 | | |
| 9. | | 19.75- | .05- | | Nov 7'49 | 231.85* |
| 10. | 231.85 | 35.00- | | | | |
| 11. | | 10.00- | .05- | | | |
| 12. | | | | 30.00 | | |
| 13. | | | | 20.00 | Nov 10'49 | 236.80* |

SKIP-TAB AND RETURN SELECTION {353, ⓘ} ⑤—352—③ ⑤—353—④  352—⑤

SKIP-TAB RELEASE →  ②—188—①

③⑤—189—④  ⑧—189  ← RETURN RELEASE

354—㊀  97 90  354  355—-㊀
91—

| | MAIN BAR | MAIN BAR | | | | |
|---|---|---|---|---|---|---|
| 1. | | | | | | |
| 2. | | R.N.K. & MAIN. LOWER BAR | | | | |
| 3. | | | | UPPER BAR | | |
| 4. | LOWER BAR | UPPER BAR. R.N. KEY & MAIN BAR | | | | |
| 5. | MAIN BAR | R.N.K. & MAIN | MAIN BAR | | | |
| 6. | | LOWER BAR | | | | |
| 7. | | | | LOWER BAR | | |
| 8. | | | | MAIN BAR | | |
| 9. | | UPPER BAR | | | | |
| 10. | MAIN BAR | HOLD DOWN LOWER BAR | | | | |
| 11. | | LOWER BAR | | | | |
| 12. | | | | HOLD DOWN LOWER BAR | | |
| 13. | | | | HOLD DOWN UPPER BAR | | |

Fig. 14.

INVENTOR
Arthur J. Fettig
BY
Fidler, Crame & Beardsley
ATTORNEYS

Patented May 5, 1953

2,637,494

UNITED STATES PATENT OFFICE 2,637,494

AMOUNT ENTERING MEANS FOR ACCOUNTING MACHINES

Arthur J. Fettig, Grosse Pointe Farms, Mich., assignor to Burroughs Adding Machine Company, Detroit, Mich., a corporation of Michigan Application March 24, 1950, Serial No. 151,641

7 Claims. (Cl. 235—60.47)

My present invention relates to improvements in amount entering means for accounting machines such as are used in posting accounts in which some or all of the items posted require the entry of supplemental items of predetermined fixed amounts. For example, banks commonly charge service fees for checks drawn against accounts of certain classes and frequently also charge service fees for at least some kinds of deposits made to such accounts. The fees charged for items of different classes may also be of different amounts. Other examples are obvious.

An object of the present invention is to provide an accounting machine with means for automatically entering such a supplemental item of any desired predetermined amount whenever the machine is operated to post an item requiring the entry of such supplemental item.

A further object is to provide a means of the aforesaid character which, when the machine is operated to post items of different kinds requiring the entry of supplemental items of different predetermined amounts, will automatically enter the supplemental items of the appropriate predetermined amounts.

A further object is to provide a means of the aforesaid character having provisions for setting the amount or amounts of the supplemental item or items to any desired value or values in a given range.

A further object is to provide manually controllable means for suppressing the automatic entry of the predetermined supplemental item when desired.

A further object is to provide means for automatically suppressing automatic entry of the supplemental item in an operation of the machine following an operation in which no amount is entered.

A further object is to improve various control mechanisms of the machine, particularly the line-spacing, carriage movement and automatic operation controls of the machine to facilitate most efficient use of the supplemental item-entering means.

Other objects and advantages of the invention will appear from the following description one embodiment of the invention illustrated, by way of example, in the accompanying drawings in which:

Fig. 6 is a perspective view on an enlarged scale of still further parts of Fig. 1 located at the lower right rear corner portion of the machine;

Figs. 7 and 8 are details of a portion of the automatic carriage control of the supplemental item-entering means;

Figs. 11 and 12 are details of parts appearing in Fig. 10;

Fig. 13 is a perspective view of portions of the line-spacing mechanism; and

Fig. 14 illustrates an example of work and shows schematically the arrangement of the control elements on the paper carriage to secure the required automatic cycling of the machine and automatic fee selection and entry and further shows diagrammatically the motor bar manipulations by the machine operator to cause the machine to perform the operations required for the illustrated example of work.

Figure 1:
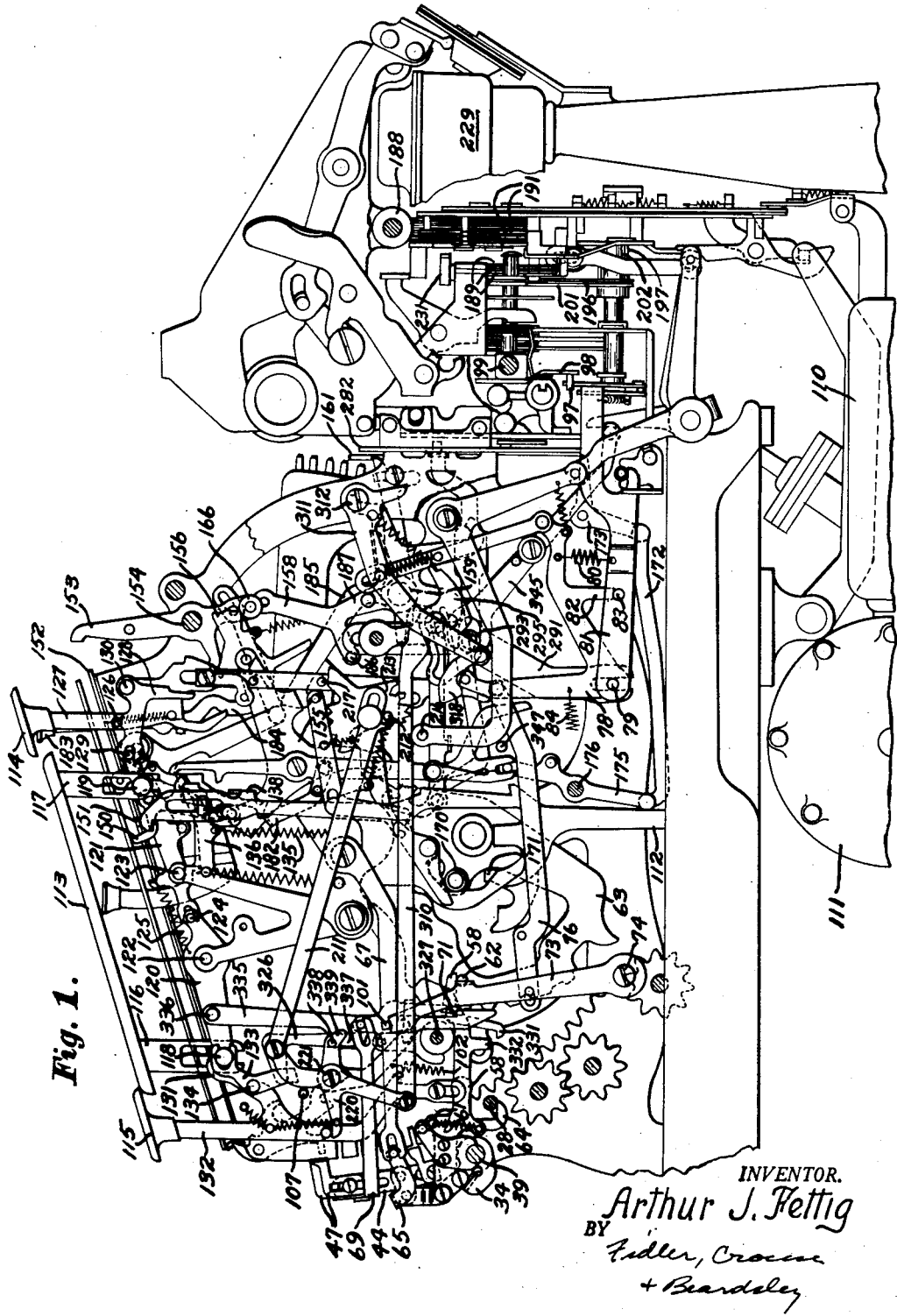
Figure 1 is a right side elevation of a machine with the casing removed and with the right side frame member broken away and the certain other parts omitted to more clearly illustrate the parts of the present invention.

In the illustrated example, the invention is embodied in a Burroughs "High Keyboard" type of accounting machine, the general structure of which is well known and disclosed in many prior patents and need not be re-described herein. Various supplemental improvements which have been made in the machine for the purpose of securing the most advantageous utilization of the principal new mechanism of the present invention will be described in detail hereinafter. The latter comprises the presettable automatic supplemental item-entering means, hereinafter briefly named the "fee-entering means," and its various control means.

The automatic fee-entering means controls those orders of the machine's amount differential mechanism required for entering the supplemental item (hereinafter called the fee) in selected cycles of operation of the machine when no amount is entered on the keyboard. In the Burroughs "High Keyboard" machine, which has been selected for illustration, the amount keys 20 for the digits from 1 to 8 control the amount differential mechanism through stop wires 21 (Fig. 2) which have hook-shaped forward ends, the transverse portions of which are guided in slots 22 in pairs of guide plates 23. By depression of their respective keys 20, the stop wires 21 are pulled back to place their hooked forward ends in the paths of forwardly projecting shoulders 24 on the upper ends of differential actuator racks 25 which are located between the guide plates 23 and through which the amounts represented by the depressed keys 20 are entered into one or more totalizers and set up in a printing mechanism. For the actuator rack 24 in each order, there is a "0" stop pawl 26 which holds the actuator at its "0" position when no key in the corresponding order is depressed but which, when the amount key for any digit from "1" to "9" in the corresponding order is depressed, is moved in the usual way by the latch slide 27 for the key row to release the actuator rack. With a "9" key depressed, the actuator 25 is permitted to move through its maximum stroke at the end of which the forward shoulder 24 on its upper end limits against a cross shaft 28 supported at its ends in the side frames of the machine. If any other key for the digits from "1" to "8" is depressed, the actuator 25 is arrested by the associated stop wire 21.

To permit the stop wires 21 in those orders with which the fee-entering means is associated to be moved to their effective positions without depression of their keys, each of those stop wires, instead of being hooked directly in the usual bell crank 29 for its key 20, is hooked, instead, to the lower end of a short arm 30 freely pivoted at its upper end on the shaft 31 on which the said bell crank is pivoted. The lower end of the arm 30 and the stop wire 21 connected thereto are urged forwardly to their normal positions by a tension spring 32 connected at its rear end to the lower end of the arm 30. The spring 32 normally holds the arm 30 engaged against a stud 33 projecting from the bell crank 29. Thus the stop wire 21, will be pulled rearwardly to effective position through the parts 29, 33 and 30 by depression of its key 20 and is also capable of moving rearwardly to effective position independently of depression of its key.

*Presettable fee-entering means*

Two yoke members 34 and 35 (Fig. 3) have their cross-bars secured together by a pair of screws and both have rearwardly extending side arms 37 and 38 formed with semicircular notches to embrace a cross shaft 39 (Figs. 1 and 2) supported at its ends in the side frames of the machine. A collar 40 secured on the shaft 39 at the right hand side of the left side arms of the yoke members 34 and 35, and a second collar 41 also secured on the shaft 39 and mentioned again hereinafter, prevent the yokes 34 and 35 from shifting lengthwise of the shaft 39. The upper yoke member 35 also has a pair of forwardly and upwardly extending side arms 42. Another yoke member 43 is pivotally supported on studs in the ends of the arms 42. A double yoke member 44 has two cross-bars integrally connecting two upwardly and downwardly extending side portions pivotally supported on studs in the rear ends of the side arms of the yoke member 43. Each side portion of the yoke member 44 has two longitudinally extending slots 45 and 46 above and below its supporting pivot studs to permit "0" stop releasing members 47 and stop-wire setting members 50 to be secured adjustably to said side portions in various positions thereon by means of headed screws and nuts. Each of the "0" stop releasing members 47 has an offset rearwardly extending "0" stop engaging projection 48 or 49 and each of the stop-wire setting members 50 has a rearwardly extending stop-wire engaging projection 51 or 52. In the orders with which the fee-entering means is associated, the "0" stop pawls 26 (Fig. 2) have downward arms with forwardly projecting ends 53 to be engaged by the projections 48 or 49 to rock the pawls to releasing position.

As will be described in detail hereinafter, means are provided for rocking the yoke member 43 to raise and lower the double yoke member 44 to select fees of different amounts and means are also provided for rocking the yoke 35 to move the double yoke member 44 rearwardly toward the "0" stops and stop wires 21 to cause entry of the selected fee and then forwardly again to normal position at appropriate times in the operations of the machine. The illustrated fee-entering means cooperates with the "0" stop pawls 26 and stop wires 21 of only the two lowest orders of the amount differential mechanisms and is adapted for fees ranging to 99 cents but it is obvious that it may be provided with parts to cooperate with the "0" stops and stop wires of other orders to provide for fees of greater amounts. Also, in the illustrated machine, the means for rocking the yoke 43 is operated so that the member 44 is given only two different vertical positions providing for fees of only two different amounts. The two vertically displaced positions of the member 44 are separated by a distance equal to only a small fraction of the spacing between adjacent stop wires 21 of the same order and it is obvious that provisions may be made for moving the member 44 to more than two different vertically spaced positions to provide for more than two different fees. It will be noticed that the projections 49 and 52 (Fig 3) are of greater width than the projections 48 and 51 so that the projection 49 is aligned with the "0" stop projection 53 and the projection 52 will be aligned with the same stop wire 21 in two different vertical positions of the member 44 whereas each of the projections 48 and 51 will be aligned with a "0" stop projection 53 and with a stop wire 21, respectively, in only one vertical position of the member 44.

When the member 44 is moved rearwardly the "0" stop pawls 26 and stop wires 21 of the orders with which the fee-entering device is associated are set to cause the desired pre-selected fee to be entered. If, in any such order, the "0" stop pawl 26 is not rocked to releasing position by a projection 48 or 49, the actuator 25 in that order will be held in its "0" position in the machine cycle, but if the "0" stop pawl is rocked to releasing position but no stop wire 21 in the same order is moved rearwardly by a projection 51 or 52, the actuator will move downward to its "9" position with its shoulder 24 against the shaft 28 in the machine cycle. If both the "0" stop pawl 26 and a stop wire 21 for the same order are moved rearwardly by projections 48 or 49 and 51 or 52, the actuator 25 for that order will move down to the position determined by the set stop wire 21. In such rearward movement of the stop wires 21 by projections 51 or 52, the connected arms 30 are rocked rearwardly without affecting the associated bell cranks 29 and keys 20.

Figure 2:
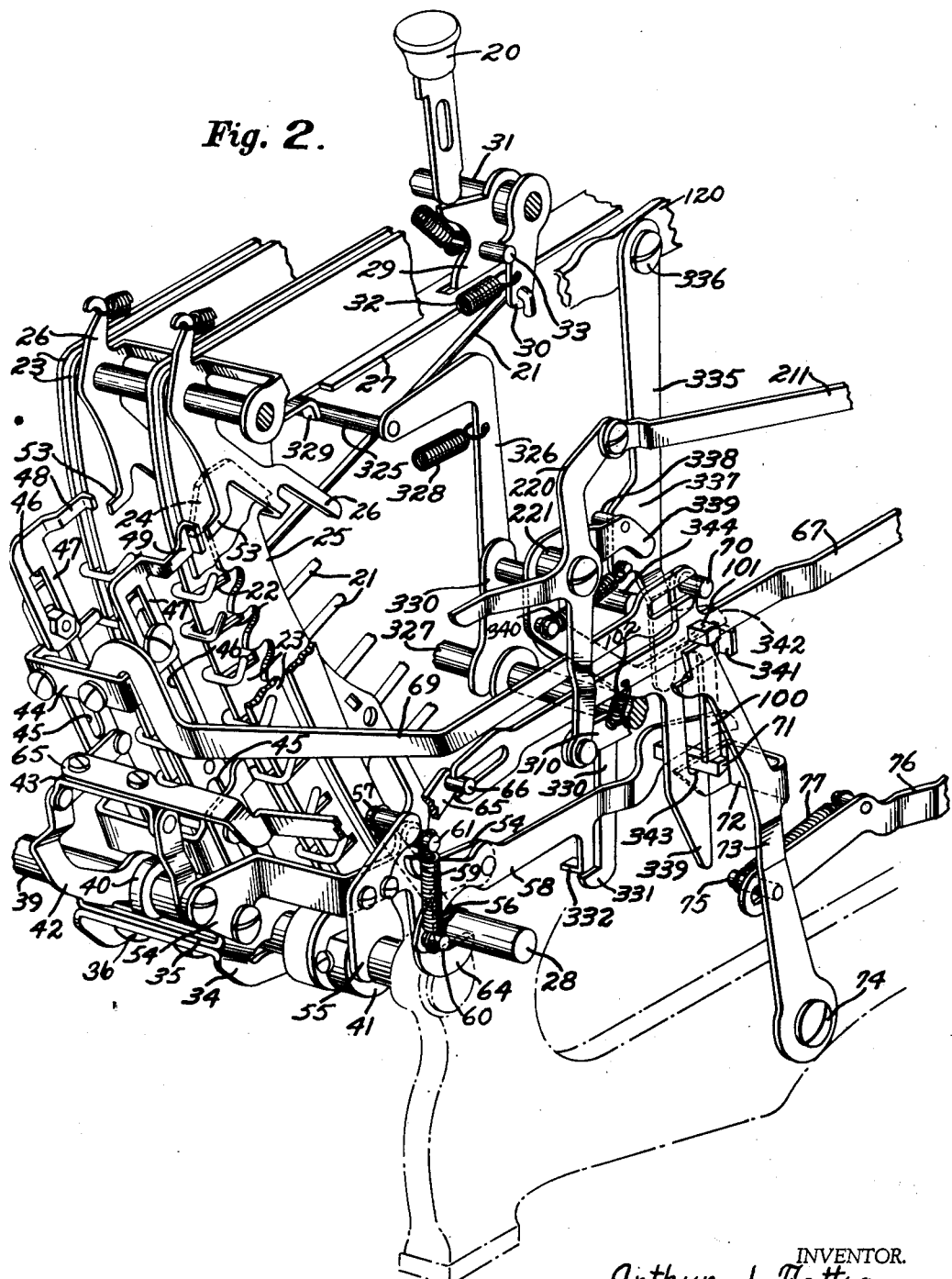
Fig. 2 is a perspective view from the upper right front corner of the machine of the automatic supplemental item-entering means of the present invention.
Figure 3:
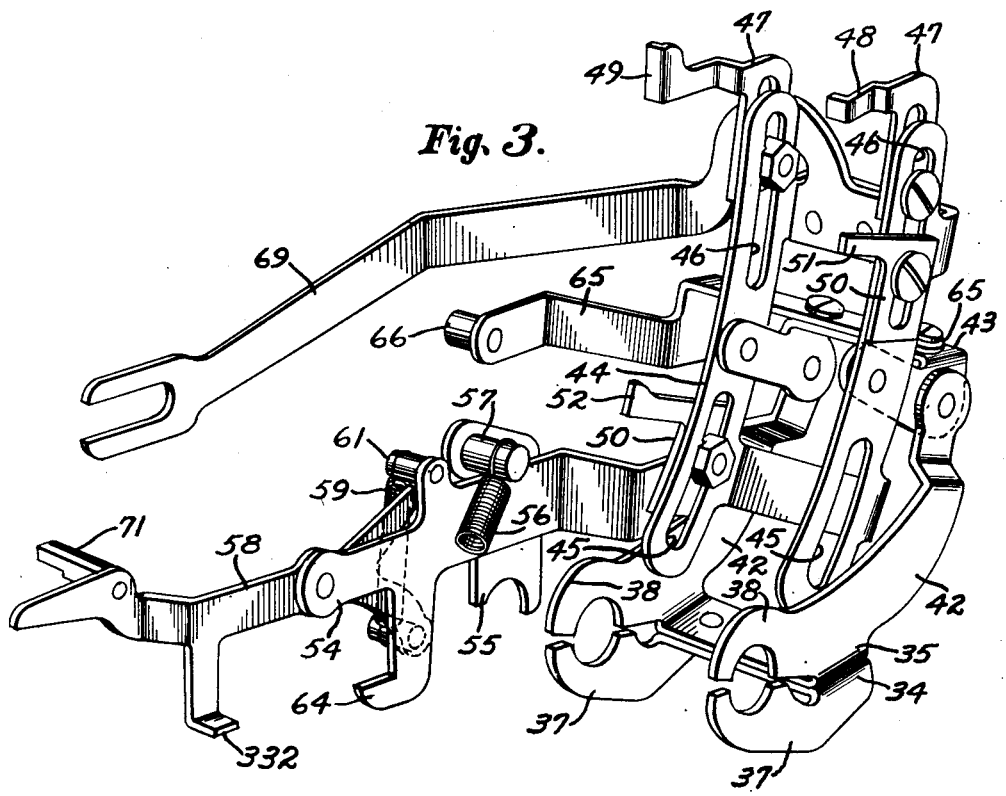
Fig. 3 is a further perspective view of portions of the supplemental item-entering means as viewed from the upper left rear corner.

Thus by appropriately selecting and positioning members 47 and 50 on the member 44 during either the original assembly or subsequent adjustment of the machine, any two desired fees up to 99 cents may be provided for, and with the addition of similar parts in an easily apparent manner, a larger number of fees and/or fees of larger amounts may likewise be provided for. The set-up shown in the drawings and most clearly in Fig. 2 is appropriate for the fees .05 and .25. As shown in Figs. 1, 2 and 3, the members 47 and 50 are secured in such positions on the side portions of the yoke that as the member 44 is moved to its upper rearward effective position in the early part of a cycle of operation of the machine as hereinafter described, the lower portion of the rear end of the projection 49 will act on the projection of the units order "0" stop 26 to rock that stop to releasing position and the lower portion of the rear end of the projection 52 will move the units order "5" stop wire 21 rearwardly into position to limit the excursion of the units order actuator 25 but the projection 48 will pass idly above the projection 53 of the tens order "0" stop 26, and the projection 51 will pass idly over the tens order "2" stop wire 21. Thus, ".05" will be entered in the machine in the course of the cycle of operation. If, however, the yoke member 44 is moved to its lower rearward effective position in the early part of a cycle of operation of the machine as also described hereinafter, the rear end of the projection 48 and the upper portion of the rear end of the projection 49 will engage the projections 53 of the tens and units order "0" stops 26, respectively, and rock both of these "0" stops to releasing position, the upper portion of the rear end of the projection 52 will move the units order "5" stop wire 21 rearwardly into the path of the shoulder 24 of the unit order actuator 25, and the rear end of the projection 51 will move the tens order "2" stop wire rearwardly into the path of the shoulder 24 of the two order actuator 25 so that "25" will be entered during the machine cycle.

Figure 5:
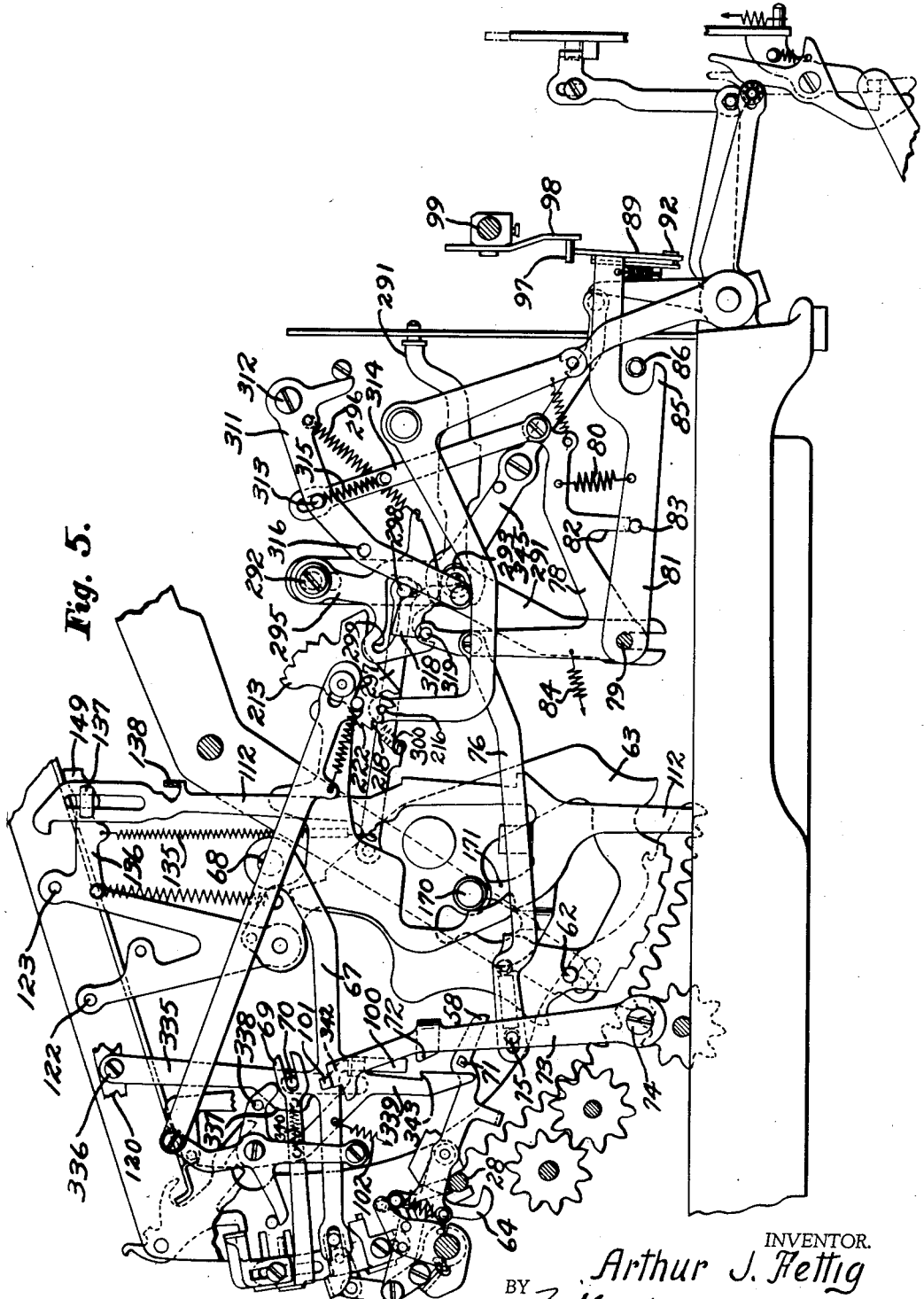
Fig. 5 is a further right side elevation on a larger scale of certain other parts of Fig. 1.

The yoke 35 is rocked on the shaft 39 for moving the member 44 toward and from the stop wires 21 by downward and upward movements, respectively, of the rearward end of an arm 54 which is secured at its forward end to the right forward arm 42 of the yoke 35 by a pair of screws. A brace member 55, engaging the right hand end of the collar 41 and having in its lower end a semicircular notch tightly embracing the shaft 39, is secured to the arm 54 by a pair of screws. A tension spring 56 anchored at its lower end to the shaft 28 and connected at its upper end to a stud 57 in an extension of the brace 55 urges the arm 54 downwardly to move the member 44 toward the stop wires 21. The arm 54 has a unilaterally flexible, rearward extension comprising a lever 58 pivotally mounted on a stud in the rear end of the arm 54. A tension spring 59 connected at its lower end to a stud 60 in a lower forward arm of the lever 58 and at its upper end to a stud 61 in the arm 54 urges an upper forward arm of the lever 58 against the underside of the stud 61. While the machine is at rest between cycles, a stud 62 (Figs. 1 and 5), secured in the usual full stroke sector 63 holds the rearward end of the lever 58 in an upward position such that the rearward end of the arm 54 is held at its upward limit where a downwardly and rearwardly extending hook portion 64 of the arm 54 engages against the underside of the shaft 28 and the upper forward arm of the lever 58 is separated somewhat from the stud 61. The spring 59 is of sufficient strength to dependably lift the rearward end of the arm 54 against the tension of the spring 56 as the rearward end of the lever 58 is raised.

A pair of screws secures a leftwardly extending front portion of a bent arm 65 to the cross-bar of the yoke 43. A rearwardly extending portion of the arm 65 carries a stud 66 engaged in a forwardly and rearwardly extending slot in the forward end of a lever 67 which is pivoted at its rear end on a stud 68 (Fig. 5) secured in the right side frame of the machine. The lever 67 may be raised and lowered by control mechanism described hereinafter to rock the yoke 43 to raise and lower the member 44. To cause the upward and downward movement of the member 44 to be in a line substantially parallel to the length of its side portions, a second bent arm 69 has its leftwardly extending portion secured by a pair of screws to the upper cross-bar of the member 44 and has, in its rearwardly extending portion, a slot receiving a stud 70 secured in the lever 67. The sides of the slots in the rearward end of the arm 69 and in the forward end of the lever 67 are so disposed that the forward and rearward movement of the member 44 will be parallel to the forward and rearward movement of the hooked forward ends of the "4" stop wires 21.

*Carriage control of operation of fee-entering means*

Figure 4:
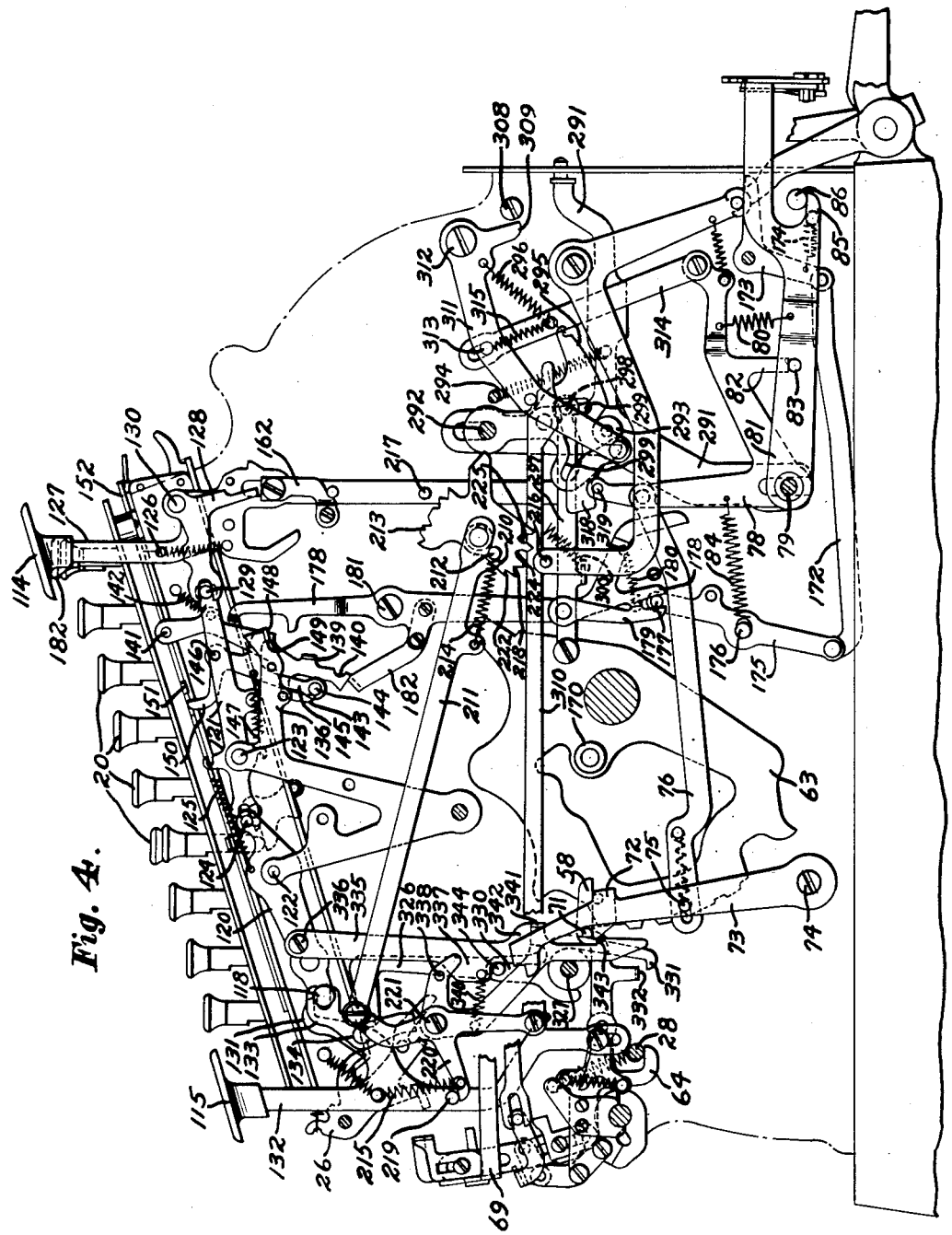
Fig. 4 is a further right side elevation of a portion of Fig. 1 on a somewhat larger scale and with further omission of parts to show certain parts more clearly.

A stud 71 (Fig. 2) secured in the rear end portion of the lever 58 is normally above the forwardly bent end of a projection 72 on an arm 73 pivotally supported at its lower end on a shouldered screw 74 threaded into the machine's right hand side frame. A stud 75 secured in the arm 73 between the projection 72 and the screw 74 extends through a slot in the forward end of a link 76. The stud 75 is normally held in the rearward end of the slot in the link 76 by a tension spring 77 connected at its forward end to the stud 75 and at its rearward end to a stud secured in the link 76. At its rear end, the link 76 (Fig. 6) is pivotally connected to the upward arm of a bell crank 78 pivotally mounted on a shouldered screw 79 secured in the right side frame. The rearward arm of the bell crank 78 is connected to the upper end of a tension spring 80 which is connected at its lower end to a lever 81 also pivotally mounted at its forward end on the screw stud 79. The spring 80 normally maintains a downward projection 82 on the rearward arm of the bell crank 78 engaged against the upper side of a stud 83 secured in the lever 81. A tension spring 84 which is connected at its rearward end to the upper arm of the bell crank 78 and at its forward end to a grooved stud, urges the bell crank 78, the lever 81 and, through the link 76, also the arm 73 counterclockwise to the normal positions of Figs. 4 and 6 where a projection 85 of the lever 81 is stopped against the underside of a stud 86 which is secured in the right side frame of the machine and serves also to secure a guide piece 87 to said frame. In such normal positions of the parts, the forward end of the projection 72 on the arm 73 is under the stud 71.

The rear end portion of the lever 81 (Fig. 6) is bent leftwardly and has a depending branch carrying a stud 88 (see also Figs. 7 and 8) pivotally supporting a pawl 89 having diverging branches 90 and 91 of unequal length. The lower portion of the pawl 89 adjacent the pivot stud 88 is formed as a cam with a depression between two rises and is engaged by a roller 92 carried on a small lever 93 which is pivoted on a stud 94 secured in the end of the lever 81. A tension spring 95 connected between the lever 81 and a stud 96 in the lever 93 urges the roller 92 against the cam portion of the pawl 89 and, so, normally yieldingly holds the pawl 89 in a middle position as shown in Fig. 6 and such that, with the lever 81 in its uppermost position, the ends of both branches 90 and 91 of the pawl 89 are in the path of a control stud 97 carried by a bracket 98 (Fig. 5) adjustably secured on a cross rod 99 of the traveling paper carriage.

The bracket 98 is secured in such a position lengthwise of the rod 99 that when the paper carriage moves to a predetermined one of its columnar positions, hereinafter referred to as the "fee column" position, the stud 97 engages in the notched end of one or the other branch 90 or 91 of the pawl 89, depending upon the direction in which the carriage moves to enter the fee column position. As the control stud 97 moves, in the final portion of the carriage movement, to a position above the pivot stud 88, it rocks the pawl 89 in one direction or the other, depending upon the direction of movement of the carriage, to the position of Fig. 7 or the position of Fig. 8. When the carriage enters the fee column position by movement in the tabulating direction, the stud 97 engages the short arm 90 of the pawl 89 and depresses the rear end of the lever 81 a short distance as shown in Fig. 7, but when the carriage enters the same position by movement in the return direction, the stud 97 acts on the long arm 91 of the pawl 89 and depresses the rear end of the lever 81 a greater distance as shown in Fig. 8. In either case, such movement of the lever 81, transmitted through the spring 80, bell crank 78, link 76 and spring 77 to the arm 73, is sufficient to withdraw the projection 72 from under the stud 71, so that as the stud 62 moves downward in the ensuing machine cycle performed with the carriage in the fee column position, the springs 59 and 56 will cause the lever 58 to follow the stud 62 until the upper forward arm of the lever 58 engages the underside of the stud 61, after which the spring 56 will cause the lever 58 to further follow the stud 62 and rock the lever 54 clockwise from its position in Fig. 4 to its position in Fig. 5 where it limits against the upper side of the shaft 28 so that the fee-entering means will be operated to enter a predetermined fee if such operation of the fee-entering means is not prevented by other control means described hereinafter.

*Carriage control of fee selection*

The arms 65 and 69 and lever 67 are normally held in their upper positions (Figs. 1 and 2) by engagement of the stud 71 against the lower end of a downward projection 100 (Fig. 2) of the lever 67. Also, a stud 101 secured in the lever 67 is above the higher step of the stepped upper end of the arm 73. The rearward movement of the arm 73 by the action of the control stud 97 on the shorter arm 90 of the pawl 89 as the carriage enters the fee column position in the tabulating direction, while sufficient to remove the projection 72 of the arm 73 from beneath the stud 71, is insufficient to move the higher step of the stepped upper end of the arm 73 from beneath the stud 101. In that circumstance, when the stud 71 moves downward in the following cycle of operation of the machine, the higher step on the upper end of the arm 73, blocking stud 101 on the lever 67, holds the member 44 in an upper position so that one of the sets of fee-entering projections carried thereby is positioned to set the "0" stops 23 and/or stop wires 21 to enter a fee of one amount. The rearward movement of the arm 73 caused by the action of the control stud 97 on the longer arm 91 of the pawl 89 as the carriage enters the fee column position in the return direction is sufficient to move the higher step on the upper end of the arm 73 rearwardly clear of the stud 101 so that when the stud 71 moves downwardly in the ensuing machine cycle, the stud 101 drops to the lower step on the arm 73 as the lever 67 is pulled downward by a tension spring 102 (Fig. 5) connected at its upper end to the lever 67 and at its lower end to a stud secured in the machine side frame. The member 44 is thereby lowered to position a second set of fee-entering projections thereon in position to set the "0" stops and/or stop wires for entering the fee of a second predetermined amount. It will be noted that such fee-selecting downward movement of the lever 67 and member 44 is effected during a short initial portion of the downward movement of the stud 71 and lever 58 and is, therefore, completed before the member 44 has been moved rearwardly sufficiently to cause any fee-entering projections thereon to engage any of the "0" stops and/or stop wires.

It will, therefore, be apparent that in a cycle of operation of the machine performed with the paper carriage in the fee column position, a fee of one predetermined amount will be set up automatically in the amount differential mechanism if the carriage entered that position by movement in the tabulating direction, but a fee of another predetermined amount will be set up in the amount differential mechanism if the carriage entered that position by movement in the opposite or return direction. Any fee thus set up in the amount differential mechanism is normally printed and entered in one or more totalizers in the same way as would be an amount set up on the keyboard of the machine.

As no further act or attention of the operator is required to effect entry of the required predetermined fee following the entry of a chargeable item, the machine embodying the invention is advantageously equipped with means automatically causing the paper carriage to move directly to the fee column position each time the machine is operated with the carriage in a chargeable item column position, and means to cause a cycle of operation of the machine for entering the fee to be performed automatically when the carriage reaches the fee column position. It will be of advantage to consider both the manual and automatic cycling controls of the machine prior to dealing with the carriage movement controls.

*Manual control of machine cycling*

The illustrated machine is driven by an electric motor 110 (Fig. 1) through the usual clutch 111 which, together with the usual switch in the power supply circuit of the motor are closed upon upward movement of a control link 112 and again opened near the end of a single cycle of the main operating mechanism of the machine. The control link 112 is controllable by three motor bars, the main motor bar 113, an upper motor bar 114 and a lower motor bar 115. The front and rear stems 116 and 117 of the main motor bar 113 are supported on studs 118 and 119 in the opposite ends of two levers 120 and 121 which are pivoted intermediate their ends on the ends of rods 122 and 123 supported in the keyboard and have a stud and slot connection 124 with each other at their adjacent ends. A tension spring 125 is connected at its ends to both of the levers 120 and 121 above the rods 122 and 123. A stud 126 in the stem 127 of the upper motor bar 114 overlies the forward arm of a bell crank 128 which has a stud and slot connection 129 at its forward end with the rear end of the lever 121 and is pivoted on a stud 130 secured in the stem 127 rearwardly of the stud 126. A rearward projection 131 of the stem 132 of the lower motor bar 115 overlies the stud 118. It will be apparent that the lever 120 will be rocked counterclockwise and that the lever 121 will be rocked clockwise against the tension of the spring 125 by the depression of any of the three motor bars.

The cycling controls as described thus far are similar to those disclosed in the Muller Patent 2,087,542 with the addition of the motor bar designated 171 in my prior Patent 2,291,154 but the motor and clutch control link 112, though somewhat similar to the link 58 of the Muller Patent 2,087,542 has been altered principally in its upper end portions and the manner in which it is controlled by the motor bars and by the automatic repeat control means has been modified. The tension spring 135 (Figs. 1 and 5) is connected at its lower end to the link 112 as usual, but its action on the link 112 has been altered. Instead of having its upper end connected to a rearward extension of the lever 121 so that it would pull the link 112 upward only as and while a motor bar is depressed as in the prior structure, the upper end of the spring 135 is connected to an arm 136 of a fixed bracket, said arm also carrying a stud 137 (Fig. 5) engaged in the vertical slot in the link 112 to guide its movement. The link 112 is thus constantly urged upward but it is normally held in a lower non-cycling position by engagement of a leftwardly bent lug 138 thereon under a rightwardly bent lug 139 (Fig. 4) on a cycling control pawl 140 which is pivoted at its upper end on a cross shaft 141 of the keyboard. The pawl 140 is urged counterclockwise (Fig. 4) by a tension spring 142 which normally maintains a front downward arm 143 of the pawl 140 engaged against the front side of a stud 144. The stud 144 is secured in the lower end of a latch lever 145 which is pivoted on a stud 146 secured in the motor bar lever 121 and is urged clockwise by a tension spring 147. The spring 147 is strong enough to easily overcome the spring 142. However, engagement of the rightwardly bent end of a latching projection 148 of the lever 145 against the rearmost end of the bracket arm 136 holds the lever 145 and stud 144 in such position that the lug 139 is held in the path of the lug 138 to prevent the initiation of a machine cycle. When any motor bar 113, 114 or 115 is depressed the stud 146 and lever 145 are lowered until the projection 148 of the lever 145 clears the end of the bracket arm 136 whereupon the spring 147 pulls the lever 145, the stud 144 and the pawl 140 clockwise until the projection 148 engages a shoulder 149 on the underside of the bracket arm 136. Thereby, the lug 139 is removed from the path of the lug 138 to permit the spring 135 to lift the link 112 to start a machine cycle. The levers 120 and 121 are latched in rocked position by the engagement of the projection 148 under the rear end of the bracket arm 136.

*Automatic control of machine cycling*

Figure 9:
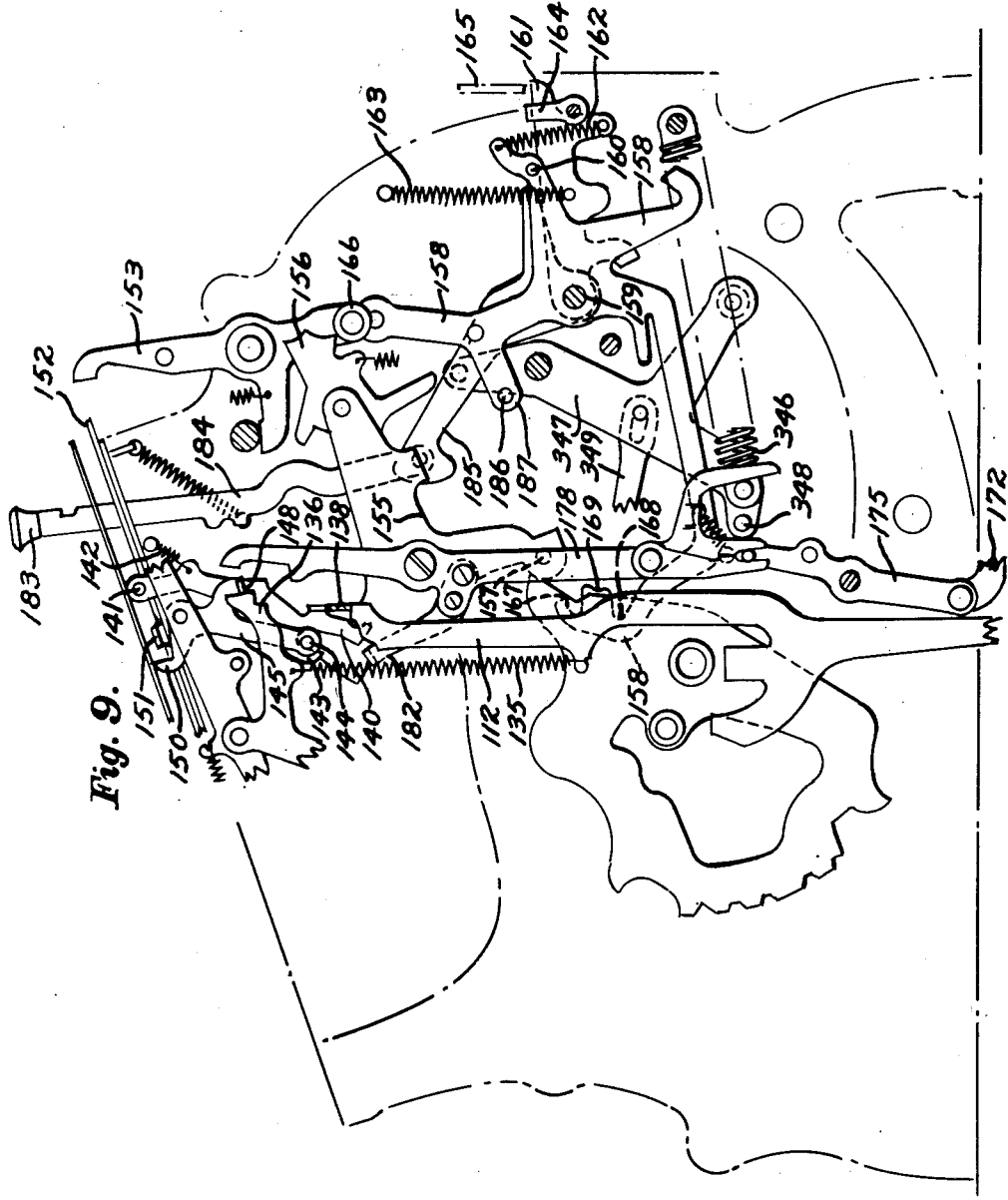
Fig. 9 is a further right side elevation, showing particularly portions of the automatic cycling control mechanism of the machine.

The latch lever 145 has a forwardly and upwardly directed arm 150 extending into the path of the lug 151 on the usual motor bar release slide 152 which is operated in the usual way by the upper arm of a lever 153 (Fig. 1) mounted on the end of a shaft 154 journaled in the machine side frames. The three armed lever 155 and some associated elements of the present machine differ in certain respects from the comparable elements of prior machines. The rearward arm of the lever 155 carries one double-stepped pawl 156 in place of the formerly usual two pass-by pawls of differing lengths (pawls 88 and 90 on lever 89 of Muller Patent 2,087,542). Also the lower arm of the lever 155 carries a stud 157 (Fig. 9) by which the rocking of the lever 155 is limited as required for automatic cycling. The usual repeat control slide and its operating lever, such as designated by the reference numbers 64 and 66 in the Muller Patent 2,087,542, are replaced by a repeat control lever 158 (Figs. 1 and 9) which is pivotally mounted on a flanged sleeve on a stud 159 secured in the left side of the right side frame of the machine. A stud 160 secured in the rearward arm of the lever 158 is normally yieldingly held in contact with the upper edge of the lever 161 also pivotally mounted on its forward end on the sleeve 159 by spring 162 connected between the rearward arm of the lever 158 and a stud secured in the lever 161. A spring 163 connected between a stud in the lever 161 and a stud fixed in the side frame of the machine normally yieldingly holds the lever 161, and thus also the lever 158, in a counterclockwise (Fig. 9) normal position determined by engagement of the rear end of the lever 161 against the bent-over end of a fixed stop 164. The lever 161, and thereby also the lever 158, is rocked clockwise (Fig. 9) to its various out-of-normal control positions by a member 165 corresponding to the member 86 of Mohr Patent 2,012,387 and similarly automatically controlled by control rollers on the paper carriage in accordance with the columnar positions of the paper carriage.

When the repeat control lever 158 is in its normal position, that is, when it is not positioned by a control roll on the paper carriage, the upwardly extending front end portion of a forward lower arm of the lever 158 is entirely out of the path of the stud 157 and will not prevent the three armed lever 155 from rocking far enough counterclockwise to cause the higher of the two steps of the pawl 156 to engage the roller 166 on the lower arm of the lever 153 in the forward stroke of a cycle of operation of the machine. Then, in the return stroke of the cycle, the pawl 156 acts on the roller 166 to rock the lever 153 counterclockwise far enough not only to release depressed amount keys but also to move the slide 152 and its lug 151 far enough forward to rock the latch lever 145 to disengage its latching projection 148 from the bracket arm 136 to permit the spring 125 to restore the levers 120 and 121 and the depressed motor bar to normal.

When the repeat control lever 158 is positioned by a small control roll on the paper carriage, the upper one 167 of two notches 167 and 168 (Fig. 9) in the upwardly extending end of the forward arm of the lever 158 is placed in the path of the stud 157 so that, in the forward stroke of the machine cycle, the lever 155 is permitted to rock clockwise only far enough to cause the lower step of the pawl 156 to become engaged with the roller 166. Consequently, in the return stroke of the cycle, the lever 153 is rocked far enough to release depressed amount keys in the usual way but not far enough to release the latching projection 148 from the bracket arm 136 to permit the levers 120 and 121 to return to normal.

When a medium size control roll on the paper carriage positions the repeat lever 158, the lug 169 between the notches 167 and 168 is placed in the path of the stud 157 to so limit the clockwise rocking of the lever 155 in the machine cycle that neither of the steps of the pawl 156 can act on the roller 166. Consequently, neither depressed amount keys nor the levers 120 and 121 will be released for return to normal.

A large control roll on the paper carriage will position the lever 158 with its lower notch 168 in the path of the stud 157. The notch 168 is of such depth that it does not limit the movement of the lever 155. Consequently the higher step of the pawl 156 is permitted to act on the roller 166 during the machine cycle to release both the depressed amount keys and the levers 120 and 121 for return to normal.

In the forward stroke of each machine cycle, a roller stud 170 (Figs. 1 and 5) carried by the full stroke sector 63 engaged a forwardly and upwardly extending projection 171 of the starting link 112 and depresses that link to a point below its normal position to permit the link 112 to be re-latched in its normal position. Thus, if the latch lever 145 is tripped and the depressed motor bar is released and restored early in the return stroke of the cycle, the pawl 140 is returned to normal by its spring 142 and places its lug 139 in the path of the lug 138 on the link 112 to prevent the latter from rising to start a further machine cycle. When the above-described automatic repeat mechanism permits the latch lever 145 to remain in its latching position, the lug 139 of the pawl 140 is held out of the path of the lug 138 so that a further machine cycle will be initiated as soon as the carriage comes to rest in its next columnar position. The means disclosed in the Muller Patent 2,012,317 to delay the starting of an automatic machine cycle until the carriage arrives in a proper columnar position is also employed in the present machine except that the latch lever 105 of the Muller patent is replaced by other parts. The link 172, bell crank 173 and spring 174 of the present machine correspond to the parts 104, 102 and 103, respectively, of the Muller Patent 2,012,317. In the present machine, the link 172 is connected at its forward end to the lower end of a lever 175 which is pivoted intermediate its ends on a stud 176 secured in the inner side of the right side frame of the machine. The upper end of the lever 175 carries a stud 177 engaged by and between the lower end of a lever 178 and the lower end of a pawl 179 which is pivoted at its upper end on a stud secured in the lever 178. A tension spring 180 connected at its ends to the lever 178 and the pawl 179, respectively, urges the lever and pawl toward each other and against the opposite sides of the stud 177. The lever 178 is pivoted intermediate its ends on the end of a shaft 181 mounted in the machine frame.

When the paper carriage is released for movement from any columnar position, the link 172 is pulled rearwardly by the spring 174 and the lever 178 is thereby rocked clockwise so that a front upward arm 182 thereof engages a laterally bent lug on the lower end of the pawl 140 and returns the latter to its normal position against the tension of the spring 147. This movement of the pawl 140 returns its lug 139 into the path of the lug 138 but does not restore the latch lever 145 far enough to disengage its lug 148 from the bracket arm 136 and to release the levers 120 and 121 for restoration by the spring 125. When the link 172 is again moved forwardly in the usual way as the carriage comes to rest in a proper columnar position, the lever 178 and its arm 182 are returned counterclockwise to normal so that the spring 147, acting through the lever 145 and stud 144, can pull the pawl 140 forwardly again against the tension of the spring 142 and remove the lug 139 from above the lug 138. Thereupon, the spring 135 raises the link 112 to initiate the automatic machine cycle.

*Disabling automatic cycling means*

In some kinds of work, a posted amount may be the total of two or more items rather than the amount of a single item. Then, the fee to be entered in the following operation should be equal to the product of the fee per item by the number of chargeable items included in the posted amount. For example, an amount posted as a deposit to a customer's checking account in a bank may represent the total of the amounts of a number of deposit items, some or all of which are subject to service charges. To prevent an automatic machine cycle and an automatic entry of a predetermined single-item fee in the fee column after the posting of an amount representing the total of a plurality of items or otherwise requiring the entry of a special fee or the sum of a plurality of fees, the operator, before depressing a motor bar for entering such an amount, will depress a "Repeat Normal" key 183 (Figs. 1 and 9), the stem 184 of which is pivotally connected at its lower end to the forward end of a lever 185 pivoted at its rear end on the sleeve 159 and overlying a stud 186 carried by a forward branch 187 of the upper arm of the repeat control lever 158. The "Repeat Normal" key stem 184 is notched in the usual manner to permit it to be latched in depressed position by engaging under the edge of the upper plate of the keyboard. While the "Repeat Normal" key 183 is in depressed position, the lever 185, blocking the stud 186, holds the repeat control lever 158 in its normal position so that any motor bar depressed to cause the machine to operate to enter the multiple item or special item amount will be released in the machine cycle and an automatic cycle will not occur when the carriage arrives in the fee column position. Then the operator may depress the amount keys necessary to set up the required fee amount and automatically disable the automatic fee-entering means, as will be explained in detail hereinafter.

*Interlocking and latching of upper and lower motor bars*

The bell crank 128 cooperates in the usual way with a fixed abutment member 162 to prevent depression of the upper motor bar 114 while either of the other motor bars 113 or 115 is depressed and to permit the usual restoring spring 108 (Fig. 4) for the upper motor bar 114 to return the latter only part way toward its normal position prior to restoration of the levers 120 and 121 if the operator, after depressing the upper motor bar to initiate an operation of the machine, withdraws manual pressure. Similarly, a bell crank 133 pivotally mounted on a stud 134 in the stem 132 of the lower motor bar 115, has one arm forked to embrace the stud 118 whereas its other arm cooperates with a fixed stud 107 to prevent depression of the lower motor bar 115 while either of the other motor bars 113 or 114 is depressed and to permit the usual restoring spring 109 for the lower motor bar to return the latter only part way toward its normal position prior to restoration of the levers 120 and 121 if the operator, after depressing the lower motor bar 115 to initiate a machine operation, withdraws manual pressure.

Hereinafter, a depression of and immediate withdrawal of manual pressure from either the upper or the lower motor bar 114 or 115 permitting immediate partial restoration thereof by its spring 108 or 109 to the position in which it is held by its bell crank 128 or 133 in cooperation with the abutment 162 or stud 107 while the levers 120 and 121 remain latched, will be referred to as a "snap" depression of the motor bar, whereas a continued manual holding of either of said bars 114 or 115 in fully depressed position until a point between the time of operation of the printing mechanism and the normal time of restoration of the levers 120 and 121 will be referred to as a "hold down" depression. It should be remembered that in an automatic cycle following a cycle initiated by depression of either the upper motor bar 114 or the lower motor bar 115, that motor bar will be held, until the levers 120 and 121 restore, in the same partially restored position in which it is held following a "snap" depression.

In the illustrated machine these variations in manipulation of the upper and lower motor bars are utilized to produce variations in the control of the movements of the paper carriage as described hereinafter.

*Modified carriage movement controls*

It will be apparent that to make it possible to utilize automatic operation of the fee-entering device in machine operations which are automatically initiated following the machine cycles in which the chargeable items are entered, it is necessary to provide means for automatically moving the paper carriage to the fee columnar position automatically from any chargeable item columnar position at the end of any cycle of operation performed with the carriage in any of the latter positions, and that it is also very highly desirable to cause the paper carriage, after the fee is printed automatically in the fee column position, to move automatically in either the tabulating or the return direction to the columnar position required for the next entry to be printed.

Figure 10:
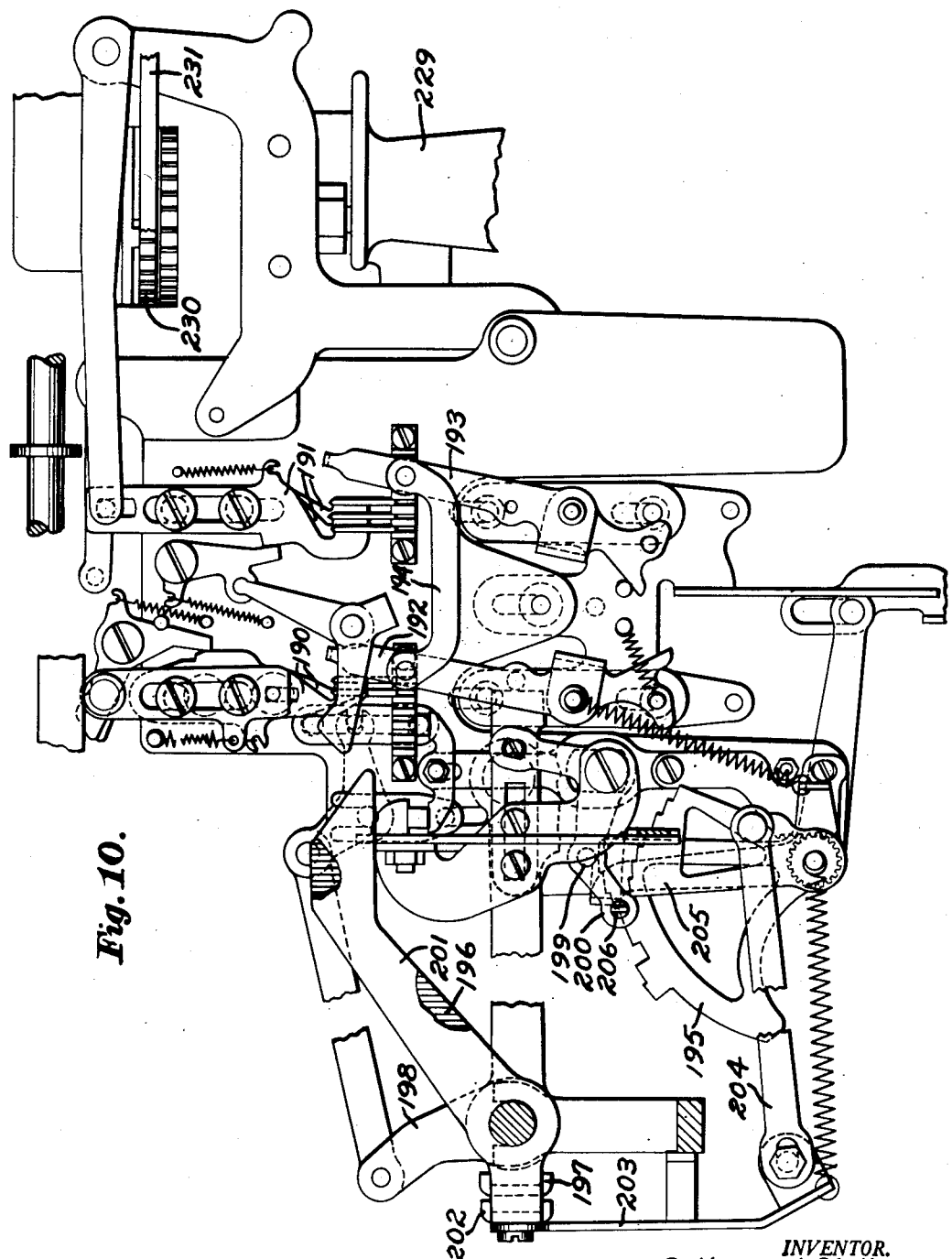
Fig. 10 is a front elevation of portions of the carriage movement control mechanism at the rear of the machine.

The carriage movement control mechanism of the illustrated machine is a modified form of that disclosed in my prior Patent 2,291,154. It will be appreciated by those skilled in the art that the modified control mechanism, like that disclosed in my prior patent is capable of being set up and arranged for various combinations or programs of carriage movements as may be required for various specific examples of work. The specific set-up of this control mechanism as illustrated in the present drawings is one suited to the particular example of work illustrated in Fig. 14 and described hereinafter. That example of work requires only two different skip-tabulating movements of the carriage and three different return movements. The control mechanism, as illustrated in Fig. 10 is, therefore, provided with only two skip control slides 190 (corresponding to the slides 54 of the patent) and three return control slides 191 (corresponding to the slides 242 of the patent). Two indexable selecting and operating members (corresponding to the members 64 and 243 of the patent) are provided—one, 192, for the skip control slides 190; and the other, 193, for the return control slides 191. However, the parts identified by reference numbers from 257 to 291 in the patent for controlling the member 248 of the patent (193 in the present case) and further parts numbered 121', and 127a, 400 to 408, 411 to 420 and 430 in the patent are all omitted from the present machine. In the present construction, a link 194 is pivotally connected at its opposite ends to both of the members 192 and 193 so that both of those members are indexed in unison by the means for indexing the member 192. The link 194 is of such length that the first two increments of movement of the members 192 and 193 counterclockwise (Fig. 10) from their normal inactive positions places member 192 in positions to act on the respective ones of the two skip control slides 190 and the next three increments of such movement places the member 193 in positions to act on the respective ones of the three return control slides 191.

The usual release members 188 (Figs. 1 and 14), corresponding to the members 140 of the patent, are so arranged that operation of the first (rearmost) control slide 190 causes the carriage to move in the tabulating direction to the column 4 position in the example of work shown in Fig. 14, while operation of the second slide 190 causes movement of the carriage in the tabulating direction to the column 5 position. The return release members 189 (Figs. 1 and 14), corresponding to the members 302 or 303 of the patent, are so arranged that operations of the front, middle and rear slides 191 cause movements of the carriage in the return direction to the column 3, column 2 and column 1 positions, respectively, in the example of Fig. 14. Both the skip and the return release members are adjustable as in the patent to provide for any desired variations of the terminal columnar positions for the carriage movements.

The selection control sector 195 corresponds to the sector 88 of the patent except that it has a different arrangement of steps on its outer edge suited to the program of carriage movements required by the work of Fig. 14. The stepped sector 195 is indexed by control rolls on the paper carriage (not shown but similar to the members 70 and 150 of the patent), through a train of parts like those shown in the patent and including a cam arm 196 and yoke 197, 198 corresponding to the parts 71, 72 and 74 of the patent. In accordance with its indexed positions, the sector 195 variably limits or prevents movement of a stud 199 corresponding to the stud 95a of the patent and mounted in a bell crank 200 corresponding to the bell crank 96a of Figs. 11 and 12 of the patent. The positioning of the sector 195 is also variable under control from the motor bars through mechanism like that disclosed in the patent except for alterations which will be explained in detail hereinafter.

The control cam arm 201 and yoke 202 of the present construction also are like the parts 255 and 256 of the patent except that the arm 257 of the yoke 256 of the patent is omitted from the yoke 202 of the present machine. Instead, a downward arm 203 is secured at its upper end to the yoke 202 and is pivotally connected at its lower end to the left end of a link 204 which is pivotally connected at its rightward end to a second selection control sector 205 which is mounted in the place of the member 400 of the patent and performs a rather different function. The sector 205 is normally positioned entirely rightward of the path of the stud 206 (corresponding to the stud 410 of the patent) on the bell crank 200 but its first increment of movement counterclockwise by the smallest of a series of control members on the carriage (corresponding to the control members 250 or 251 of the patent) places the highest step of the sector 205 immediately under the stud 206 to prevent effective movement of the bell crank 200. Successively larger size control members on the carriage position the sector 205 with successively lower ones of its steps under the stud 206 to permit increasing numbers of increments of carriage skip and return selecting movement of the bell crank 200. This makes it possible by the placing of control members of selected sizes on the carriage to act on the control cam arm 201 in appropriate positions of the carriage to either variably limit or altogether eliminate influence of the motor bars on the selection of carriage movements from selected positions of the carriage. For example, when the carriage is in a position where a control roll positions the sector 195 to permit, say, three increments of selecting movement of the bell crank 200, a control roll may also be positioned to act on the cam arm 201 to position the sector 205 to permit no more than four increments of selecting movement of the bell crank 200. Then, no motor bar, when depressed, could increase the permitted selecting movement of the bell crank 200 by more than a single increment. The utility of this effect will appear from the description of the example of work shown in Fig. 14.

As already mentioned, the means through which the motor bars influence the position of the sector 195 is similar to the corresponding means of my Patent 2,291,154. However, as shown in Fig. 14, the shoulder 210 on the link 211 (numbered 188 and 177 in the patent) is reversed in relation to the stud 212 on the notched disk 213 (numbered 187 and 184 in the patent) and a tension spring 214 is connected between the stud 212 and an ear on the link 211 so that, upon depression of the lower motor bar 115, the notched disk 213 is yieldingly urged clockwise (Fig. 1) instead of being positively forced clockwise. Also with this reversed arrangement of the shoulder 210 and stud 212, the spring 215 (corresponding to the spring 174 of the patent) serves to return the disk 213 to its normal position so that the spring 189 of the patent is no longer required. Further, the notches in the lower edge of the disk 213 are made with depths suited to the carriage movement control required for the work of Fig. 14. The disk 213, as in the patent, is normally positioned so as not to act on the stud 216 (200 in the patent) in a machine cycle and, therefore, not to alter the position of the sector 195 as determined by the control rolls on the carriage. Upon a "hold-down" depression of the upper motor bar 114, the stud 217 in its stem 127 rocks the disk 213 clockwise to position the notch 218 to cooperate with the stud 216 to move the sector 195 three steps clockwise (Fig. 10) from the position in which it is placed by the carriage control. Following a "snap" depression of the upper bar 114, the stud 217 holds the disk 213 with its notch 222 aligned with the stud 216 so that the sector 195 is moved only one step clockwise beyond the position in which it is placed by the carriage control. Upon depression of the lower motor bar 115, a stud 219 in the stem of the latter rocks a bell crank 220, pivotally mounted on a stud 221 in the machine side frame, so that the link 211 is pulled forwardly and the disk 213 is thereby rocked. A "snap" depression of the lower motor bar 115 permits the disk 213 to restore partially to align the notch 224 with the stud 216 so that, when the disk 213 is lowered in the machine cycle, the sector 195 is moved two steps clockwise beyond the position given it by the carriage control. Upon a "hold-down" depression of the lower motor bar 115, the disk 213 is held fully rocked so that its notch 225 is aligned with the stud 216. The notch 225 is of such depth that the stud 216 will not be depressed in the ensuing machine cycle and the sector 195 is not rocked beyond the position in which it is placed by the carriage controls. However, in a machine cycle initiated by a "hold-down" depression of the lower motor bar 115, a means, described hereinafter in connection with the line-spacing mechanism, is active to prevent movement of the paper carriage from any columnar position except the fee column position.

It will be apparent that the two skip control slides 190 and three return control slides 191 shown in Fig. 10 will be sufficient to provide for movements of the paper carriage from an old balance pick-up position to either of two chargeable item-entering positions, from either of the latter two positions to a fee-entering position located between them, from the fee-entering position to either of the chargeable item positions or to a new balance position, and from the latter position back to the old balance pick-up position. Only three return movements, two skip tabulating movements and the normal single column tabulating movement of the paper carriage are required in such a program in addition to the disablement of carriage by a "hold-down" of the lower motor bar, as described hereinafter.

*Modified automatic line-spacing control*

In prior Burroughs standard "High Keyboard" machine, the line-spacing mechanism is operated by portions of the carriage return mechanism whenever the latter is operated to move the carriage in the return direction. Those machines also had mechanism controlled by a "Carriage Normal" key and frequently also by one or more motor bars as, for one example, in the machine of my prior Patent 2,340,372, to operate the line-spacing mechanism in a machine cycle independently of the carriage return mechanism. Such keyboard-controlled line-spacing mechanism, when conditioned for line-spacing, also disabled the carriage tabulating mechanism as shown in the last-mentioned patent.

As previously explained, the fee-entering means of the present invention is conditioned to enter one fee when the paper carriage enters the fee column position from one direction and to enter a different fee when the carriage enters the fee column position from the opposite direction. In both cases, the fee should be printed in the same line of the work form as the item on which it is based. Thus, in the present machine, it is necessary to suppress line-spacing when the return movement of the paper carriage is to terminate in the fee column position. If another chargeable item is to be entered following the entry of a fee, that other item must be entered in a new line of the form in order that another fee may be entered in the fee column in the same line as such other item. Thus, when a tabulating movement of the paper carriage from the fee column position is to terminate in a chargeable item column position, the line-spacing mechanism must be rendered effective without disabling the tabulating mechanism. However, the line-spacing mechanism must not operate in a machine cycle in which the carriage tabulates to the fee column position, and it must operate in machine cycles in which the carriage moves from the fee column position in the return direction. If the fee-entering mechanism is to operate automatically in a machine cycle initiated automatically upon arrival of the paper carriage in the fee column position as previously explained, then the above-mentioned required controls of the line-spacing mechanism must also be effected automatically.

The construction and operation of the carriage return mechanism are as disclosed in the Rinsche Patent 1,580,534 as modified by my prior Patent 2,291,154. It comprises a fixed housing 229 (Figs. 1 and 13) in which is a gear 230 (Fig. 10) adapted to be driven from the machine drive motor through a clutch and meshing with a rack 231 mounted on the paper carriage for a limited sliding movement relative to the carriage. The mounting at one end of the rack 231 is shown in Fig. 13 where a bracket 232 secured to the underside of the rack 231 carries a headed stub 233 passing through a horizontally elongated slot 234 in a plate 235 rigidly secured to the paper carriage frame. A tension spring 236 connected at one end to a stud in the rack 231 and at the other end to a stud in the plate 235, normally holds the rack 231 at the rightward limit, as viewed from the rear of the machine as in Fig. 13, of its travel relative to the carriage. When the carriage-return clutch is engaged, the rack normally is moved to the opposite end of its travel relative to the carriage, stretching the spring 236, before it picks up the carriage and moves the latter in the return direction. Upon subsequent disengagement of the carriage-return clutch, the spring 236 returns the rack 231 to its normal position on the carriage.

A line-spacing pawl 237 (Fig. 13) is pivoted on the upward arm of a crank 238 pivoted on a stud 239 secured in the carriage frame. A rearward arm of the crank 238 is connected through a link 240 to the leftward arm of a crank 241 pivoted on a stud 242 secured in the carriage frame. A downward arm of the crank 241 carries a stud 243 positioned on the leftward side of a block 244 secured to the underside of the rack 231.

When the rack 231 is moved leftward (Fig. 13) relative to the carriage upon engagement of the carriage-return clutch, the cranks 241 and 238 are rocked to engage the line-spacing pawl 237 with the line-spacing ratchet wheel 245 and advance the latter and when the return clutch is again disengaged and the rack 231 is moved rightwardly to its normal position relative to the carriage by the spring 236 at the end of the carriage return movement, the line-space pawl 237 and cranks 238 and 241 are returned to normal by a tension spring 246 connected between a stud in the crank 238 and a stud (not shown) secured in the carriage frame. Thus, line-spacing normally is effected each time the carriage return mechanism is set into operation to return the carriage.

In the present machine, the bracket 232 is formed on its lower edge with a leftwardly (Fig. 13) facing shoulder 247 located normally a little to the right of the nose of a pawl 248. A hollow hub 249 secured in the pawl 248 intermediate the ends of the latter is rotatably supported in the plate 235 and has an arm 250 secured to its forward end, as by means of a screw. A stud 251 secured in the leftward (Fig. 13) end of the arm 250 underlies the leftward arm of the pawl 248. A tension spring 252 connected at its ends to studs in the arm 250 and in the plate 235 normally maintains the stud 251 against the leftward arm of the pawl 248 and yieldingly holds the latter at the clockwise limit of its movement in contact with a limit stud 253 secured in the plate 235 and with the rightward arm of the pawl out of the path of the shoulder 247. A stud 254 is secured in and projects rearwardly from a pass-by pawl 255 pivotally mounted on a stud 256 secured in the depending end of the leftward arm of the pawl 248. A tension spring 257 connected between the stud 254 and a lug on the pawl 248 urges the pawl 255 counterclockwise and normally holds the stud 254 engaged against the depending portion of the pawl 248. A cam plate 258 has, at one end, guide flanges 259 turned toward each other behind a small plate 260 in which is threaded a clamping screw 261 whereby the cam plate 258 is mounted on and may be secured in any adjusted position lengthwise of a rail 262 secured to the carriage return drive housing 229. The cam 258 is adjusted to and secured in such position that it is above the stud 254 while the carriage is in a chargeable item column position to which the carriage may move in the tabulating direction from or through the fee column position.

In the example of work shown in Fig. 14 and described hereinafter, the amounts of checks are entered in the chargeable item column at the left of the "Fees" column and the amount of deposits are entered in the chargeable item column at the right of the "Fees" column. It will be convenient to refer to the chargeable item columns at the left and at the right of the "Fees" column as the "Checks" column and the "Deposits" column, respectively, hereinafter, though it should be remembered that other kinds of chargeable items can be entered in those columns, additional chargeable item columns may be provided, and machines embodying the invention may be employed for various kinds of work.

When the carriage enters the "Deposits" column position by movement in the tabulating direction (rightward in Fig. 13), the stud 254 encounters a downwardly inclined edge 263 of the cam plate 258 and is cammed downwardly under the plate 258. The pawl 248 is thereby rocked to place its nose behind the shoulder 247 where it is held by the plate 258 while the carriage remains in the "Deposits" column position. Then, in the course of an operation of the machine to enter an amount in the "Deposits" column, when the carriage return mechanism is set in operation to return the carriage to the "Fees" column position, the shoulder 247 of the bracket 232 engages the nose of the pawl 248 which prevents the rack 231 and block 244 from moving relatively to the carriage sufficiently to operate the line-spacing pawl 237 to line-space the platen. Consequently, when the machine operates after the carriage comes to rest in the "Fees" column position, the fee is printed in the same line as the amount of the chargeable item printed in the "Deposits" column. When the carriage return mechanism is set into operation while the paper carriage is in any columnar position where there is no cam plate 258 above the stud 254, the nose of the pawl 243 is out of the path of the shoulder 247, and the rack 231 will be moved relatively to the carriage to operate the bell crank 241 to line-space the platen at the beginning of each such operation of the carriage return mechanism.

In previously known Burroughs machines, line-spacing may also be effected in selected machine cycles by operation of a second line-spacing pawl 270 (Fig. 13). The pawl 270 is pivoted on a stud 271 in the rearward end of an arm 272 pivotally supported at its forward end on the platen shaft 273. A link 274 is pivotally connected at its upper end to the stud 271 and at its lower end to a pin 275 which is carried by and adjustable to different positions in a crank arm 276 secured on a shaft 277 journaled in the carriage frame. A bail rod 278 is secured, by a plurality of arms like the arm 279, to the shaft 277 and passes through slots between pairs of rearward projections 280 on a slide 281 vertically slidably mounted on the back plate 282 (Fig. 1) of the machine. Adjacent the lower projections 280 are two rearward projections 283 of the usual tabulating slide 284 which is moved downward in the forward stroke and returned upwardly in the return stroke of each cycle of operation of the machine. The slide 281 and bail rod 278 are normally unaffected by the reciprocations of the tabulating slide 284.

A coupling pawl 285 pivotally mounted on a stud in the tabulating slide 284 has a projection 286 adapted to enter a notch 287 in the line-spacing slide 281 to couple the latter to the tabulating slide. The coupling pawl 285 is normally yieldingly held in uncoupled position by a tension spring 288 but is movable to coupling position by a control member 289. In a machine cycle initiated while the pawl 285 couples the slide 281 to the slide 284, the slide 281 is pulled downward with the slide 284 by the pawl 285 in the forward stroke of the cycle. The bail rod 278, shaft 277, and crank arm 276 are thereby rocked to raise the link 274, the rear end of the arm 272, and the line-spacing pawl 270 which is yieldingly urged against the ratchet wheel 245 by a tension spring, part of which is shown at 290. In the return stroke of the cycle, the projections 283 of the upwardly returning slide 284 raise the bail rod 278, thus pulling the link 274 and line-spacing pawl 270 downwardly to normal position so that the ratchet 245 and the platen are rotated to line-space the papers on the latter. It will be noted that because of the projections 283, it is really immaterial whether or not the pawl 285 remains in coupling position during the return stroke of a machine cycle.

The control member 289 is like the member 168 of my prior Patent 2,340,372 and is operated through connections (not shown) like the connections 540 to 547, inclusive, of that patent by a slide 291 (Fig. 4) corresponding to the slide 537 of the patent and vertically slidably mounted on the stud 79 and on a stud 292 also secured in the machine side frame. It should be noted that one of such connecting members, namely the link numbered 543 in the patent, has a projection (545 in the patent) which prevents carriage tabulation by holding the tabulating pawl (52 in the patent) in an ineffective position while another projection (546 in the patent) of said link holds the control member 289 (168 in the patent) in position to couple the pawl 285 to the tabulating slide 284 to cause line-spacing. Also as in my last-mentioned prior patent, the slide 291 carries a roller 293 which a tension spring 294, connected at its lower end to the slide 291 and at its upper end to a stud in the machine side frame, urges against the lower cam edge of a cam sector 295 pivotally supported on the stud 292. A tension spring 296 urges the cam sector counter-clockwise (Fig. 4) to yieldingly hold the forward vertical edge of a cam notch in the lower edge of the sector against the roller 293, thereby permitting the spring 294 normally to hold the slide 291 in its uppermost position. As in my last-mentioned prior patent, the coupling pawl 285 is in uncoupled position while the slide 291 is in its normal upper position but is moved to coupling position by downward movement of the slide 291.

A link 297 is pivotally connected at its forward end to a stud in the full stroke sector 63. A stud 298 secured in the rearward end of the link 297 projects into an irregular slot 299 which is formed in the cam sector 295 and has a normally substantially vertically extending portion joining at its upper end with the rear end of a normally generally horizontal portion. The spring 296 and roller 293 normally maintain the vertical portion of the slot 299 aligned with the stud 298 while the machine is at rest and a tension spring 300 normally maintains the stud 298 in alignment with the horizontal portion of the slot 299 so that movement of the link 297 by the full-stroke sector in a machine cycle merely causes the stud to reciprocate in the horizontal portion of the slot 299 without rocking the cam sector 295 to depress the roller 293 and slide 291 to move the coupling pawl 285 to couple the line-space slide 281 to the tabulating slide 284.

Prior Burroughs "High Keyboard" machines, such as those disclosed in my prior Patent 2,349,372, in the Muller Patent 2,012,317 and in other prior patents, have had various means operated or controlled by one or another of the motor bars to depress the stud 298 into the vertical portion of the slot 299 to cause the cam 295 to be operated during selected machine cycles to depress the slide 291 and thereby move the pawl 285 to coupling position to cause a line-spacing operation of the line-spacing pawl 270 and move the tabulating pawl to ineffective position and thus suppress carriage tabulation. The present machine is provided with a means operable by the lower motor bar 115 to depress the stud 298 to cause operation of the line-spacing pawl 270 and with a means controlled by the paper carriage through the bell crank 78 to lift the stud 298 out of the vertical portion of the slot 299 too late in the machine cycle to interfere with line-spacing but early enough to prevent suppression of carriage tabulation.

The bell crank 220 has a downward third arm pivotally connected to the forward end of a link 310 having a rearward cam portion guided between the cam sector 295 and a lever 311 pivotally mounted on a stud 312 secured in the machine side frame. The rear end of the link 310 rests on the stud 298. The lever 311 carries a stud 313 projecting into a slot in the upper end of a link 314 which, at its lower end, is pivotally connected to a stud in the rearward arm of the bell crank 78. A tension spring 315 connected between a stud on the link 314 and the stud 313 normally holds the latter stud in the lower end of the slot in the link 314. A stud 316 secured in the lever 311 projects transversely above the rear end of the link 311 but is normally positioned sufficiently above the upper edge of the rear end of the link 311 so that rearward movement of the link 311 by depression of the lower motor bar 115 does not cause depression of the stud 298. However, when the bell crank 78 is rocked clockwise, as previously explained, by entry of the paper carriage into the fee column position from either direction, the link 314 is pulled downward and, through the spring 315, rocks the lever 311 to engage a short downward arm 309 thereof against a limit stud 308 secured in the machine side frame and to lower the stud 316 to an effective position. The lower edge of the rear end portion of the link 310, forwardly of its point of contact on the stud 298 while the link and stud are in their normal positions, is inclined first forwardly and downwardly for a substantial distance and at about a right angle to a line connecting the centers of the studs 298 and 292. Immediately forward of such downwardly inclined portion, the lower edge of the link is inclined steeply upwardly and forwardly for a short distance and then runs substantially horizontally forwardly. The upper edge of the rear end portions of the link 310 has three steps or portions at three different horizontal levels, the highest step being foremost and the lowest step being rearmost and located under the stud 316 while the link 310 is in its normal position. Cam inclines connect the middle step with each of the others. The rearward step on the upper edge of the link 310 is of such low height that when it is under the stud 316 and the latter is lowered by the entrance of the carriage into the "Fees" column position, the stud 298 is not depressed from the forwardly extending branch of the slot 299. The middle step is of such height that when it is under the stud 316 and the latter is in its normal position, the stud 298 still remains in the rear end of the forwardly extending branch of the slot 299, but if that middle step is under the stud 316 and the latter is lowered by entrance of the carriage into the "Fees" column position or if that middle step is moved under the stud 316 while the latter is in its lowered position, the rear end of the link 310 is lowered and depresses the stud 298 below the forwardly extending leg of the slot 299. The foremost and highest step on the rear upper edge of the link 310 is of such height that when it is moved under the stud 316, the rear end of the link 310 is cammed down and moves the stud 298 down out of the forwardly extending leg of the slot 299 regardless of the position of the paper carriage.

In a "hold-down" depression of the lower motor bar 115, the link 310 is held so far rearwardly that the foremost highest step at its rear upper edge is maintained under the stud 316 and line spacing is effected by depression of the slide 291 during the ensuing machine operation regardless of the position of the paper carriage. Following a "snap" depression of the lower motor bar 115, the link 310 is immediately permitted to be returned forwardly by the spring 215 only far enough to maintain the middle step on its rear upper edge under the stud 316 so that line spacing will take place during the machine cycle if the carriage is in the "Fees" column position but will not occur if the carriage is in any other columnar position where the stud 316 is not lowered from its normal position.

A stud in the lower forward end of the lever 311 pivotally supports the rear end of a cam wedge 318, the forward part of which rests on a stud 319 in the upper arm of the bell crank 78. The clockwise rocking of the bell crank 78 and the counterclockwise rocking of the lever 311 when the paper carriage enters the fee column position places the upper edge of the wedge 318 in such position that, if the stud 298 is down in the vertical part of the slot 299, and is pulling the cam sector 295 forwardly in the forward stroke of a machine cycle, the stud 298 will engage the inclined upper edge of the wedge 318 and will thereby be cammed into the horizontal portion of the slot 299 so that the sector 295 will be uncoupled from the full stroke sector close to the end of the forward stroke of the cycle. At that time, the line space slide 281 has been lowered with the slide 284 to the full extent required to effect line-spacing but it may be noted that the spring 288 is not sufficiently strong to disengage the tooth 286 of the pawl 285 from the slide 281 while the slide 281 is being pulled downwardly by the tooth 286. The cam sector 295 is thereupon returned to normal by the spring 296 and permits the spring 294 to restore the slide and parts operated thereby, including the heretofore mentioned link 543 of my prior Patent 2,340,372 so that the usual tabulating pawl (52 of the patent) may return to effective position before the tabulating slide 284 commences its upward movement. The spring 288 restores the pawl 285 to uncoupled position as soon as the frictional hold of the tooth 286 on the lower edge of the notch 287 is sufficiently relieved but, as the slide 284 moves upward in the return stroke of the machine cycle, the tabulating pawl releases the carriage in the usual way for a tabulating or skip-tabulating movement and the projections 263 restore the bail rod 278 and, through the latter, drive the line-spacing pawl 270 to line-space the platen.

Thus, if the machine, while the paper carriage is in the "Fees" column position, performs a cycle of operation at the end of which the carriage is to tabulate to the "Deposits" column position in consequence of such cycle having been initiated by depression of the lower motor bar 115 or initiated automatically following a cycle initiated by depression of that bar, line-spacing will be effected so that the next chargeable item to be posted will be printed in a line lower than the previously printed fee and will permit the fee for such next chargeable item to be printed in horizontal alignment with the amount of the latter. As previously explained, the subsequent return movement of the paper carriage from the "Deposits" column position to the "Fees" column position is effected without line-spacing.

*Disabling fee-entering means by depression of amount keys*

Standard mechanism of the illustrated Burroughs "High Keyboard" machine includes a bail rod 325 (Fig. 2) supported in the upper forwardly extending ends of two side arms 326 pivotally mounted at their lower ends on a cross shaft 327 supported at its ends in the machine side frames. The bail 325 and arms 326 are normally yieldingly held forwardly by a tension spring 328 connected between one of the arms 326 and a stud (not shown) secured to the inner side of the right side frame. Only the right-hand one of those side arms, 326, is shown in the drawings. The bail rod 325 is positioned behind depending lugs 329 of each of the key latch slides 27 for the amount key rows so that when any amount key 20 is depressed, the bail rod 325 is moved rearwardly by the lug 329 of the latch slide 27 which is moved rearwardly by the key depression.

In accordance with the present invention, an arm 330 (Figs. 2 and 4) secured to the right-hand arm 326 has a downward extension on the lower end of which is a forward latch projection 331. The projection 331 is normally rearward (Fig. 4) of the path of a lateral lug 332 on a downward projection of the lever 58, but when the arms 326 and 330 are rocked clockwise (Fig. 2) by depression of an amount key, the projection 331 is moved under the lug 332 to prevent clockwise movement of the lever 58 sufficient to operate the fee-entering means.

Thus, when the carriage is in the "Fees" column position, a predetermined fee is automatically entered when the machine is cycled without an amount set up on the keyboard but if an amount is set up on the keyboard before the machine is cycled, that amount will be entered instead of the predetermined automatically selected fee. As previously explained, depression and latching of the "Repeat Normal" key before initiating a machine cycle with the carriage in a chargeable item column position prevents automatic cycling of the machine when the carriage arrives in the "Fees" column position and, thus, gives the operator an opportunity to set up an amount on the keyboard for entry instead of the automatically selected predetermined fee.

*Preventing automatic fee entry if no amount was entered in the preceding cycle*

The machine may be operated with the paper carriage in either of the chargeable item column positions ("Checks" column or "Deposits" column) without entering any amount in such operation, and, if the "Repeat Normal" key 183 is not in depressed position, the machine will then automatically perform a further cycle of operation with the carriage in the "Fees" column position, but in any such event, the automatic fee-entering means will be disabled automatically and no fee will be entered.

A link 335 (Figs. 1, 2, 4 and 5) is pivotally suspended at its upper end on a stud 336 carried by the forward arm of the lever 120 whereby the link 335 is moved downwardly from its normal position of Figs. 1 and 2 by depression of any motor bar. On its forward edge, the link has a forwardly projecting cam portion 337 with an upwardly and rearwardly inclined upper edge, and a substantially vertical front edge normally engaging against a stud 338 in the rearward arm of a latch lever 339 pivoted on the stud 221. The vertical front edge of the cam portion 337 is normally held pressed against the stud 338 by a tension spring 340 connected between the lower part of the cam portion 337 and an irregularly shaped downward arm of the latch lever 339. The latter arm has a rearwardly extending and rightwardly bent projection 341 normally under a rearward projection 342 on the lower end of the link 335. It also has, on the rearward edge of its lower portion, an upwardly facing shoulder 343 normally immediately under the stud 71 in the lever 58. A stud 344 secured in the upper end of the arm 330 extends rightwardly in front of the link 335 below the cam portion 337.

When any amount key 20 is depressed, the resulting clockwise (Figs. 1 and 2) movement of the arms 326 and 330 carries the stud 344 rearwardly against the front edge of the link 335 to prevent the latter from moving forwardly while the key remains depressed. If, then, any motor bar is depressed, the link 335 is thrust downwardly and its projection 342 carries the projection 341 downwardly, rocking the latch lever 339 clockwise and withdrawing the shoulder 343 forwardly of the stud 71. If that occurs in a machine operation performed with the carriage in either of the chargeable item column positions where the automatic repeat control mechanism is effective to prevent release of the depressed motor bar, the levers 121 and 120 and the link 335 will remain down while the carriage moves to the "Fees" column position where another cycle of machine operation starts automatically as previously described. In the cycle of operation performed with the carriage in the chargeable item column position, the depressed amount keys are released as usual and the arms 326 and 330, and the stud 344 return to normal. That permits the lower end of the link 335 to be moved forwardly by the spring 340 but not far enough to remove the projection 342 from above the projection 341 which was also moved forwardly as it was moved downwardly about the stud 221. Thus, in the automatic machine cycle performed in the "Fees" column position of the carriage, the latch shoulder 343 is forwardly out of the path of the stud 71 if an amount was entered in the preceding cycle of operation of the machine. The lug 72 is also positioned rearwardly of the stud 71 as previously described and the latch hook 331 is ineffective because no amount keys are in depressed position. The automatic fee-entering mechanism will, therefore, operate as previously described to enter the required one of the predetermined fees.

However, if no amount key is in depressed position as a motor bar is depressed with the carriage in a chargeable item column position, the stud 344 is in its forward position and permits the spring 340 to pull the lower end of the link 335 forward as it is lowered and its cam portion 337 is carried below the stud 338. The projection 342, therefore, misses the projection 341 and the shoulder 343 remains under the stud 71. The depressed motor bar is not released but remains latched down, as previously explained, to cause an automatic machine operation when the carriage arrives at the "Fees" column position, in which operation the shoulder 343 holds up the stud 71 and so prevents operation of the automatic fee-entering means. Thus, when no chargeable item is entered in a machine cycle performed with the carriage in a chargeable item column position, the automatic fee-entering mechanism is prevented from entering a fee when the machine automatically performs a cycle of operation with the paper carriage in the "Fees" column position.

*Preventing automatic fee entry by manipulation of motor bar to enter "free" item*

As already explained, when the slide 291 carrying the roller 293 is depressed to effect line-spacing in any cycle of operation of the machine except a cycle performed while the paper carriage is in the "Fees" column position, automatic movement of the carriage in the tabulating direction is prevented by disabling the tabulating pawl through connections operated by the slide 291 as disclosed in my prior Patent 2,340,372. Those connections operated by the slide 291 do not prevent automatic return movements of the paper carriage nor do they prevent setting and latching of the slides 190 which might interfere with subsequent movements of the paper carriage. In the illustrated machine, the roller stud 293 is embraced in the slotted forward end of a lever 345 (Fig. 1) which otherwise corresponds to the lever 37 of my prior Patent 2,291,154 and, when rocked counterclockwise, as viewed in Fig. 1, operates means like those disclosed in the patent to prevent operation and latching of any of the slides 190 and 191. It will, therefore, be apparent that if the lower motor bar 115 is in depressed position in a cycle of operation performed with the carriage in the "Fees" column position, the platen will be line-spaced, the means to operate the slides 190 and 191 will be ineffective, the positions of the sectors 195 and 205 will be of no consequence, and the paper carriage will perform a single-column tabulating movement to bring the chargeable item ("Deposits") column immediately rightward of the "Fees" column to the printing position.

Also, as explained above, when the carriage is in any position other than the "Fees" column position, a "hold down" depression of the lower motor bar 115 will bring about a downward movement of the roller 293 and slide 291 which not only disables the tabulating pawl but also, as just explained, prevents operation of any of the slides 190 and 191 so that the paper carriage will remain stationary in the same columnar position while the platen is line-spaced.

As a "hold-down" depression of the lower motor bar 115 can be effected in either of the chargeable item ("Checks" and "Deposits") columns where, as previously described, the machine, when it is operated, is normally automatically conditioned to perform a further automatically initiated cycle of operation, it is necessary to disable such automatic cycling control during machine operations in which the carriage is held stationary in the same columnar position. For this purpose, when the slide 291 is lowered, a stud 301 (Figs. 4 and 9) secured in the slide 291, encounters a projection 302 (Fig. 9) of the automatic repeat control lever 158 and restores the latter to its normal position against the tension of the spring 162 and thus permits the three-armed lever 155 to rock far enough in the machine cycle to cause the higher step on the pawl 156 to act on the stud 166 to release the depressed motor bar in the return stroke of the machine cycle. Thus, a "hold down" depression of the lower motor bar 115 in either of the chargeable item columnar positions also disables the automatic cycling mechanism.

In view of the foregoing, to operate the machine to enter a "free" item, that is, either a debit or credit item for which there is no fee, the operator, after setting up the amount of the item, will merely effect a "hold-down" depression of the lower motor bar which will prevent the carriage from automatically moving to the "Fees" column position and, so, will also prevent an automatic fee-entering operation of the machine. At the end of such "free" item-entering operation, if the next item to be posted to the same account should be entered in a different chargeable item column, the operator may either move the carriage manually to the proper position or, before entering the amount of such next item on the keys, depress the appropriate motor bar to effect a blank cycle of operation, after which the carriage will move to the "Fees" column position and the machine will automatically cycle without entering a fee, whereupon the carriage will move to the required columnar position.

Total-taking

When the illustrated machine is set up, as hereinafter described for performing the work illustrated in Fig. 14, any operation of the machine performed with the paper carriage in the "Fees" column position and with the upper motor bar 114 depressed will be followed by automatic skip-tabulation of the carriage to the "New Balance" column position where a total is to be printed. Various known total-taking mechanisms are suitable for use in the illustrated machine embodying the invention. Some of the known total-taking mechanisms, such as that disclosed in my prior Reissue Patent 22,986, result in the printing of the correct total, whether positive or negative, in a single cycle of operation of the machine and others, such as that disclosed in the Muller Patent 1,844,070 require the performance of a blank or spacing cycle between the last item-entering operation and the total-taking cycle when the total is of the algebraic sign opposite the sign of the last entered item. Still others require more than one spacing stroke. It is preferable, but not essential, that the total-taking mechanism be automatically controlled by the paper carriage. Whenever the total-taking mechanism employed is not controlled automatically by the paper carriage and whenever the total-taking mechanism employed is of a kind requiring the performance of one or more spacing cycles preceding some or all total-taking cycles, the machine will be provided with a control roll 353 to act on the cam lever 201 to place the sector 205 in a position to prevent operation of any of the slides 190 and 191, and with means, such as that shown in Figs. 1 and 10 of the Muller Patent 2,202,596 to prevent the paper carriage from leaving the "New Balance" column position until a total-taking operation is performed.

Preferably, the machine will be equipped with a single-stroke, positive and negative total-taking mechanism such as disclosed in my Reissue Patent 22,986, and such total-taking mechanism will be controlled automatically by the paper carriage through mechanism (also not shown) which is already known and in public use and, therefore, will not be described in detail herein. Such known control mechanism is operable by a power spring 346 through a normally latched bell crank 347 which are generally comparable to the parts 10 and 41 of Patent 1,844,070 and the similar parts of Patent 2,274,803. The bell crank 347 is releasable by mechanism which is operable by manual depression of the total key in a manner comparable to that disclosed in Patents 1,844,070 and 2,274,803 and also automatically by the lower rearward arm of the repeat lever 158 when the latter is rocked by a large control roll in the automatic repeat control roll lane on the paper carriage in a manner generally comparable to that disclosed in Patent 2,274,803. When the bell crank 347 is released either manually or automatically to the action of the spring 346, a stud 348 in the downward forward arm thereof acts on a downward rearward branch of the lever 178 to rock the latter counterclockwise so that the upper end of the lever will engage and rock the pawl 140 clockwise to initiate a machine cycle. A link 349 connected to the bell crank 347 and corresponding generally to the link 50 of Patent 1,844,070 is simultaneously pulled rearward and insures a depression or completion of depression of the total key so that the total is drawn and printed during the machine cycle. Interlock devices operated from the machine drive shaft and from crank 173, respectively, prevent release of the bell crank 347 while the machine is cycling and while the paper carriage is not at rest in a proper columnar position. A further interlock controlled by the bail 141 of my Reissue Patent 22,986 prevents the release of the bell crank 347 automatically by the lever 158 but not by manual depression of the total key when the totalizer contains a negative total. Such negative total lock is to serve only as a warning to the operator by suppressing the automatic total-taking when a negative total occurs so that the operator may then depress the total key to complete the posting and then take whatever action may be required in respect of the overdraft of the account.

Example of work

In the following description of the example of work shown in Fig. 14, it will be assumed that the illustrated machine embodying the present invention is equipped with the last-mentioned single stroke automatic total mechanism, but it will be understood that such work can also be performed when other forms of total-taking mechanism are provided.

Fig. 14 shows, in its upper portion, a single example of work performed with the illustrated machine embodying the invention. In its middle portion, it shows schematically the arrangement of automatic control elements on the paper carriage to produce the automatic carriage movements, automatic machine cycling, and automatic operation of the fee-entering mechanism required for performing the kind of work illustrated. In its lower portion, it shows schematically the automatic movements performed by the paper carriage during the performance of the particular example of work illustrated, indicates which of the motor bars is required to be depressed for each manual initiation of machine operation required in that example, and indicates the required depressions of the "Repeat Normal" key 183.

The example of work shown in Fig. 14 is chosen merely for simplicity and clarity in showing various advantages of the invention, and it will be apparent to those skilled in the art that the illustrated machine and other machines in which the invention may be embodied, may readily be adjusted and adapted for various kinds of work in which the invention may advantageously be employed.

In Fig. 14, 350 represents a portion of a statement form which may be used in connection with customers' checking accounts with banks. In addition to the usual "Checks," "Deposits" and "New Balance" columns, it has also a "Fees" column located between the "Checks" and "Deposits" columns. The paper 351 may be a ledger sheet which is placed in the machine behind the statement form with a carbon sheet (not shown) interposed between the two and having the same columnar arrangement as the statement form except that it has an "Old Balance" column at the left which the statement form does not have. It will be understood that the paper 351 might also be provided at its left with additional columns, such, for example, as "2nd Pick-Up" and "Proof" columns, or that the "Old Balance" column, with or without the "2nd Pick-Up" and "Proof" columns and with or without one or more additional columns may be on a journal sheet or tape. The choice and arrangement forms may easily be suited to the needs or desires of the user.

The elements 352 are the control members (like the members 70 or 150 of my prior Patent 2,291,154) on the paper carriage which act on the cam lever 196 (Fig. 10). The elements 353 are the control members (like the members 250 or 251 of my prior Patent 2,291,154) which act on the cam lever 201. It will be noted, however, that in the present case, the cam lever 196 participates in the selection of both skip-tabulating and return movements of the paper carriage, and the cam lever 201 is instrumental in limiting the effects of the motor bars in the selection of both kinds of movement of the paper carriage. As previously mentioned, the skip-tabulation release members 188 are like the elements 140 of my last-mentioned patent, and the return release members 189 are like the elements 302 or 303 of said patent.

In the following, the skip and return latch slides 190 and 191 will be considered as being numbered from #1 to #5, inclusive, in the order in which they are selected by successively farther counterclockwise movements of the selecting and operating members 192 and 193 in Fig. 10. In Fig. 14, the skip and return release members 188 and 189 are also numbered in accordance with the individual latch slides #1 to #5 which they serve to release. The numbers appearing within the outlines of the selecting rolls 352 and 353 indicate the different extents to which they depress the cam levers 196 and 201 and the positions to which they rock the sectors 195 and 205. For the example of Fig. 14, the sectors 195 and 205 may have their control edges formed as shown in Figs. 11 and 12. Automatic cycling control rolls are indicated by 354 and an automatic total control roll is indicated at 355. Also, for the example of work shown in Fig. 14, the machine may be automatically conditioned for subtraction by a known control means (not shown) set to be effective when the carriage is in the "Checks" column position and when the carriage is in the "Fees" column position. The machine is normally in adding condition.

The selection and depression of various motor bars by the operator to cause the machine operation required for the postings shown in the numbered lines in the upper portion of Fig. 14, and the resulting movements of the paper carriage are indicated in the correspondingly numbered lines in the lower portion of Fig. 14. The indicated depressions of the several motor bars are "snap" depressions except where "hold-down" depressions are specifically indicated.

In the following it will be assumed that the papers will be handled by the operator in any customary or suitable manner.

The entry at the top of the "New Balance" column in Fig. 14 may be made by any suitable method employed by the user for "balance forward" operations.

With the posting media for the first posting to the particular account being considered before the operator, and the papers 350 and 351 in the carriage of the machine, the operator will note the amount of the balance forward and will enter that amount on the keys of the machine. With the paper carriage in the "Old Balance" position, and noting that the first item to be posted is a check, the operator will depress the main motor bar, causing the machine to operate to print the amount of 200.00 in the "Old Balance" column. It will be noted that there are no skip-tabulating or return latch selecting rolls 352 or 353 in active position when the carriage is in the "Old Balance" column position and that depression of the main motor bar does not cause any movement of the sector 195 in the resulting machine operation. As the sector 195 remains in normal position in the machine operation, the latch selecting and operating members 192 and 193 will not receive any latch selecting movement and none of the latch slides 190 or 191 will be operated. Consequently after the printing of the amount in the "Old Balance" column, the paper carriage will tabulate normally to the "Checks" column position. Thereupon, the operator will enter the amount of the check, 11.00, on the keys and, noting that the next item to be posted is also to be entered in the "Checks" column, the operator will again depress the main motor bar to cause the machine to operate to print the amount of 11.00 in the "Checks" column.

Because a #1 roll 353 is in active position when the carriage is in the "Checks" column position, the sector 205 is positioned one step counter-clockwise (Fig. 10) from its normal position and thus prevents selection and operation of any latch slide 190 or 191 by the members 192 or 193. Consequently after operation of the printing mechanism to print the amount of 11.00, the paper carriage again is given a normal tabulating movement to the next columnar position, i. e., to the "Fees" column position regardless of which motor bar was depressed.

Because a repeat control roll 354 was in active position as the machine operated with the paper carriage in the "Checks" column position, the main motor bar which was depressed to initiate that operation remains latched down at the end of the operation and causes the machine to perform a further automatically initiated operation immediately when the paper carriage comes to rest in the "Fees" column position. As the paper carriage enters the "Fees" column position, the stud 97 engages the arm 90 of the automatic fee selecting mechanism and, in the manner hereinbefore explained, conditions the automatic fee mechanism to enter the fee of .05 in the automatic machine operation performed with the paper carriage in the "Fees" column position.

When the paper carriage is in the "Fees" column position, a #5 control roll 352 and a #5 control roll 353 are both in active position. With the main motor bar in depressed position as the machine operates with the carriage in the "Fees" column position, the rolls 352 and 353 alone determine the positions of the sectors 195 and 205 so that the sector 195 is positioned five steps clockwise (Fig. 10) from its normal position and the sector 205 is positioned five steps counterclockwise from its normal position. For the particular example of the work under discussion, the sectors 195 and 205 have the configurations shown in Figs. 11 and 12, so that with both sectors moved five steps away from normal, the sector 205, cooperating with the stud 206, will limit the counterclockwise movements of the members 192 and 193 to cause the #4 return slide 191 to be selected and operated to set up a return movement of the paper carriage. In the initial power drive of the rack 231 (Fig. 13) in the return direction and before the rack picks up the carriage, the block 244, acting on the stud 243, drives the pawl 237 to line-space the platen. After the paper carriage has returned slightly past the "Checks" column position, the #4 return release member 189 will release the #4 latch slide 191 to cause the carriage return mechanism to be disengaged and permit the carriage to drop back to the "Checks" column position under the influence of the usual spring-wound tabulating tape.

With the paper carriage in the "Checks" column position, the operator will enter the amount of the next item, 55.00, on the keys. It will be assumed that the posting medium, such as a charge voucher, shows that this item is a special item such as, for example, the certification of a check for the amount of 55.00 for which a fee different from the regular fees of .05 and .25 for checks and deposits is charged. In such case the operator will depress the "Repeat Normal" key 183 and latch it down or hold it down and, noting that the next item to be posted is a deposit item the operator will depress the lower motor bar 115. In this machine operation the amount of 55.00 will be printed and the #1 roll 353 will again insure that the paper carriage is tabulated to the "Fees" column position, but because of the depression of the "Repeat Normal" key, the depressed motor bar will be released in the course of machine operation and the machine will not be automatically cycled when the carriage arrives in the "Fees" column position. Then the operator will release the "Repeat Normal" key and enter the correct fee, .30 for check certification, and noting that the next item to be posted is a deposit item, will effect a "snap" depression of the lower motor bar 115. The machine will then operate to print the amount of .30 in the "Fees" column, the automatic fee-entering mechanism being disabled, as previously explained, because of the depression of an amount key.

Because of the depression of the lower motor bar 115, the slide 291 is operated, as previously explained, to cause the line-space pawl 270 to line-space the platen after printing. The operation of the slide 291 also prevents operations of any of the slides 190 and 191, as previously explained, but during the operation with the carriage in the "Fees" column position, the pawl 318 (Fig. 1) is effective to uncouple the cam sector 295 from the link 297 to permit the sector and the slide 291 to restore to normal in time to permit effective operation of the tabulating pawl. Consequently, after the printing of the fee of .30, the paper carriage performs a normal tabulation to the "Deposits" column position.

Next, the operator enters the amount, 35.00 of the deposit on the keys and, noting that there are no further items to enter at that time, depresses the upper motor bar 114. Thereupon, the machine operates to print the amount of 35.00 in the "Deposits" column. With the carriage in the "Deposits" column position, a #3 roll 352 and a #4 roll 353 are active, but as previously explained, the "snap" depression of the upper motor bar 114 causes the sector 195 to be moved one step farther from normal than it is moved by the roll 352, so that both sectors 195 and 205 are in their fourth positions away from normal at the time the studs 199 and 206 are lowered and the sector 205 limits the movement of the stud 206 when the member 193 is in position to operate the #3 latch slide 191 to initiate a return movement of the carriage. In the operation with the carriage in the "Deposits" column, the cam 256 (Fig. 13) holds the pawl 248 with its nose aligned with the shoulder 247 to prevent line-spacing by the operation of the carriage return mechanism. When the carriage returns slightly past the "Fees" column position, the #3 release member 189 releases the #3 slide 191 to disengage the carriage return mechanism and permit the carriage to drop back into the "Fees" column position where, as the upper motor bar 114 is still latched down in consequence of the effect of the repeat control roll 354 which is active when the carriage is in the "Deposits" column position, the machine will perform an automatic operation. As the carriage enters the "Fees" column position in the return direction, the stud 97 engages and acts on the longer arm 91 of the automatic fee-selecting control means and, in the manner previously described, causes the automatic fee mechanism to be conditioned and operated to enter the deposit fee of .25 and print it in the same line as the 35.00 deposit amount.

During the last-mentioned operation, the depressed upper motor bar 114 causes the sector 195 to be moved one step farther from normal than it is moved by roll 352, and the sectors 195 and 205 consequently are in their sixth and fifth positions from normal, respectively, when the studs 206 and 199 are lowered. The sector 195, therefore, limits the downward movement of the stud 199 when the member 192 is positioned to operate the #1 slide 190 to set up a skip-tabulating movement of the carriage. However, immediately when the paper carriage tabulates past the "Deposits" column position, the #1 release member 188 releases the #1 slide 190 to permit the carriage to be arrested in the "New Balance" column position, whereupon a total-taking operation is performed, as previously explained.

With the carriage in the "New Balance" column, a #5 roll 352 is in active position but no roll 353 is active. Consequently the #5 slide 191 is selected and operated by the member 193 to set the carriage return mechanism in operation to line-space the platen and return the carriage across the machine. When the carriage has returned slightly past the "Old Balance" column position, the #5 release member 189 releases the #5 latch slide 191 to disengage the carriage return mechanism and permit the carriage to drop back into the "Old Balance" colunm position. Preferably, an entire series of release members 189 from #1 to #5 will be positioned to insure that any operated and latched slide 190 or 191 will be released when the carriage is returned slightly past the "Old Balance" position and the carriage will be permitted to drop back into the latter position.

When performing the posting indicated in line 4 of the form in Fig. 14, the operator will enter the old balance of 168.40 in the same manner as the old balance of 200.00 was entered in the posting operation starting in line 1 with the exception that, noting that the item to be entered is a deposit item, the operator will effect a "snap" depression of the lower motor bar 114 instead of depressing the main motor bar 113 to initiate the machine operation. In a machine operation initiated by a "snap" depression of the lower bar 115, while the carriage is out of the "Fees" column position, the line-spacing slide 291 is not operated. The sector 195 is moved two steps from normal prior to the descent of the stud 199 so that the #2 latch slide 190 is operated to set up a skip-tabulating movement of the paper carriage. After the carriage passes the "Fees" column position, the #2 release member 188 releases the #2 slide 190 to permit the carriage to be arrested in the "Deposits" column position. Then the operator enters the amount of the deposit 174.55 on the keys, and noting that this amount is the total of three different deposit items, the operator depresses the "Repeat Normal" key 183 and holds or latches it down.

Regardless of which motor bar the operator depresses to initiate the deposit-entering operation, the sector 205 is positioned in its fourth position from normal by the #4 roll 353 and the sector 195 will be positioned in either its third, fourth or fifth position from normal either by the #3 roll 352 or by the combined effect of that roll and the depressed motor bar. In any event the sector 205 will limit the stud 206 when the member 193 is positioned to operate the #3 slide 191 to set up a return movement of the carriage. The cam 258 prevents line-spacing by the operation of the carriage return mechanism and the #3 release member 189 releases the #3 slide 191 to disengage the carriage return mechanism when the carriage has returned slightly past the "Fees" column position to permit the carriage to settle into that columnar position. As the "Repeat Normal" key 183 is latched down, the depressed motor bar will be released at the end of the manually initiated machine operation, whereupon the operator will release the key 183 and enter the fee of .75 on the keys, representing a fee of .25 for each of the three items combined in the deposit amount of 174.55.

Noting that there is no further item to enter at that time, the operator will effect a "snap" depression of the upper motor bar 114, whereupon the machine will operate to print the amount of .75 in the "Fees" column position, the automatic fee-entering mechanism being disabled, as heretofore explained, in consequence of the depression of the amount keys. With the upper bar 114 depressed in the machine operation performed with the carriage in the "Fees" column position, a skip-tabulating movement of the carriage to the "New Balance" column position will be effected in the same manner, as previously explained, in connection with the entries in line 3.

In the posting starting in line 5 of Fig. 14 the old balance of 342.20 is entered in the same manner as the old balance of 200.00 in line 1, and the carriage tabulates to the "Checks" column position. Then the 150.00 special charge item and the special .15 fee are entered in the same manner as the 55.00 item and .30 fee in line 2, except that, as the next item will be a check item, the main motor bar 113 is depressed to initiate the special fee-entering operation with the carriage in "Fees" column position. In the latter operation, both sectors 195 and 205 are in their fifth positions and the sector 205 limits the stud 206 to cause the #4 latch 191 to be selected and operated to cause the carriage return mechanism to operate to line-space the platen and return the carriage to the "Checks" position. Then the check amount 14.85 is entered on the keys and as the next item is a deposit item, the lower motor bar 115 is given a "snap" depression to initiate the machine operation in which 14.85 is printed in "Checks" column, after which the carriage tabulates to the "Fees" column position and the machine then cycles automatically to print the .05 fee as in line 1. In the latter operation, because the lower motor bar 115 is in depressed position and the stud 316 is in lowered position, the line space slide 291 is lowered to cause line-spacing and to prevent operation of any of the slides 190 and 191 but the cam member 318 is effective to permit operation of the tabulating pawl so that the carriage tabulates to the "Deposits" column position.

Next, the operator enters the deposit amount of 50.00 on the keys and, noting that there is a second deposit item to be entered, initiates a machine cycle by a "snap" depression of the lower motor bar 115. After the printing of the amount 50.00 in the "Deposits" column, the carriage, as explained in connection with the "Deposits" entry in line 3, to the "Fees" column position after which the machine cycles automatically to enter and print a .25 fee also as in line 3, but as the lower motor bar 115 is again in depressed position in the latter operation, as it was during the entering of the .05 fee in line 6, the platen is again line-spaced and the carriage again tabulates to the "Deposits" column position.

Then the operator will enter the 25.00 deposit amount on the keys and, noting then that there is a further check to be entered, the operator will depress the main motor bar. After the printing of the 25.00 amount in the amount in the "Deposits" column, the carriage again returns to the "Fees" column where another .25 fee is printed as before. As the main motor bar 113 is in depressed position in the last automatic fee-entering operation, the carriage will then return to the "Checks" position just as it did after the automatic fee entry in line 1.

Then the operator enters the amount of the further check, 19.75 on the keys and, noting that there is no further item to be entered at the time, effects a "snap" depression of the upper motor bar 114 to cause the machine to operate to print the amount of 19.75 in the "Checks" column, after which the carriage tabulates to the "Fees" position and a .05 fee is entered for reasons previously explained. In this last automatic fee-entering operation, the depressed upper bar 114 causes the sector 195 to be moved one step farther than it is moved by the #5 roll 352 so that the #1 slide 199 is operated to cause the paper carriage to skip-tabulate to the "New Balance" column position. The new balance is printed in the "New Balance" column and the carriage is again returned to the "Old Balance" column.

In the posting commencing in line 10 of Fig. 14 the old balance of 231.85 is entered and the carriage tabulates to the "Checks" position in the same manner as in lines 1 and 5. The operator then enters the amount 35.00 on the keys. Noting from the posting material that the item is a "free" or "non-fee" item, the operator effects a "hold-down" depression of the lower motor bar 115. The "hold-down" depression of the lower motor bar not only causes operation of the line-spacing slide 291 and prevents operation of any of the slides 199 and 191, but because the carriage is not in the "Fees" column position, it also prevents effective operation of the tabulating pawl so that the platen is line-spaced and the carriage remains in the same columnar position. Then, while the machine performs a single cycle of operation, the automatic cycling means being also disabled by the "hold-down" depression of the lower bar 115, the entry of the check amount of 10.00 in the "Checks" column in line 11 is effected in the same manner as the entry of the check amount of 150.00 in line 5 so that after the printing of the 10.00 amount the paper carriage tabulates to the "Fees" column position, the machine automatically cycles to print the .05 fee, the platen is line-spaced and the paper carriage then tabulates to the "Deposits" column position. After entering the deposit amount of 30.00 on the keyboard, the operator, noting that it is another "free" item and that there is a further deposit item to be entered, effects a "hold-down" depression of the lower bar 115 to initiate a single machine cycle in which, after the printing of the 30.00 deposit amount, the platen line-spaces and the carriage is held stationary in the same columnar position for the reasons previously explained. The 20.00 deposit amount is entered on the keys. Noting that this is another "free" item and the last item, the operator then effects a "hold-down" depression of the upper motor bar. This causes the sector 195 to be moved three steps beyond the position in which it is placed by the carriage control. The sector 195 will, therefore, be in its sixth position so that the #1 slide will be operated and the carriage will move to the "New Balance" position where the machine will be operated to take and print the total, after which the carriage will be returned to the "Old Balance" position as previously explained. It will be understood that because of the repeat control roll in the "Deposits" column position, if the machine were equipped with a manual total-taking mechanism instead of the single-stroke automatic total mechanism, it would be necessary to depress the "Repeat Normal" key 183 and latch it down prior to the "hold-down" depression of the upper motor bar 114.

If the 35.00 check amount in line ten had been the only check amount to be entered at the time of that posting, i. e., if the 10.00 check amount in line eleven had not been available for posting, the operator, after completing the entry of the 35.00 in line ten as described, would have the choice of moving the carriage manually to the "Deposits" column position for the entry of the deposit amount of 30.00 in line twelve or, while the carriage was still in the "Checks" column position after releasing the "Repeat Normal" key 183 but without depressing any amount keys, merely effecting a "snap" depression of the lower motor bar 115. In the latter case, the machine would have operated exactly as it did in entering the 10.00 check amount and .05 fee in line eleven except that no amounts would be printed or entered into the totalizer mechanism. Whenever a machine operation is initiated by a "snap" depression of any motor bar while the carriage is in either the "Checks" column position or the "Deposits" column position, without depressing the "Repeat Normal" key 183 and without any amount entered on the keys 20, the machine merely performs a blank cycle of operation and the carriage moves automatically to the "Fees" column position, whereupon the machine performs another blank cycle during which the automatic fee-entering mechanism is disabled, as previously described, in consequence of no amount keys having been depressed for the previous cycle, and the carriage automatically moves to the columnar position determined by the motor bar which was depressed.

Other examples of work in which the various advantages of the invention can be utilized will be apparent to those who are skilled in the art.

I claim:

1. In an accounting machine having means to drive it through cycles of operation, calculating mechanism, printing mechanism, manipulative amount setting means, a plural order differential mechanism controlled in a machine cycle by said amount setting means to enter amounts determined by the latter into said calculating and printing mechanisms, and a traveling paper carriage, the combination of a support mounted for movement from an ineffective position to an effective position and reversely, at least one control member secured on said support in a selected position thereon for movement therewith to a position to control the extent of operation of said differential mechanism in at least one order thereof in accordance with the selected position of said control member on said support when said support is in said effective position, means operable by the machine cycling drive means to move said support to its effective position to cause said member to control said differential mechanism to enter a predetermined amount into said calculating and printing mechanisms and to return said support with the control member thereon to ineffective position in a cycle of operation of the machine, means controlled by said traveling carriage in accordance with the position thereof to enable and disable said support-moving means, and adjustable securing means to secure said control member on said support in any one of a plurality of selected positions thereon to thereby determine the extent of operation of said order of differential mechanism in cycles of operation of the machine in which said support is moved to said effective position.

2. In an accounting machine having means to drive it through cycles of operation, calculating mechanism, printing mechanism, manipulative amount setting means, a plural order differential mechanism controlled in a machine cycle by said amount setting means to enter amounts determined by the latter into said calculating and printing mechanisms, and a traveling paper carriage, the combination of a support mounted for movement from an ineffective position to either of two effective positions and reversely, at least one element on said support in a position to control an order of said differential mechanism when said support is in one of said effective positions, at least one other element on said support in a position to control an order of said differential mechanism when said support is in the other of said effective positions, means operable by the machine driving means to move said support to either of its effective positions, and means controlled by said traveling carriage to condition said support-moving means to move said support to either of said effective positions.

3. In an accounting machine having means to drive it through cycles of operation, calculating mechanism, printing mechanism, manipulative amount setting means, a plural order differential mechanism controlled in a machine cycle by said amount setting means to enter amounts determined by the latter into said calculating and printing mechanisms, and a traveling paper carriage, the combination of a support mounted for movement from an ineffective position to either of two effective positions and reversely, at least one element on said support in a position to control an order of said differential mechanism when said support is in one of said effective positions, at least one other element on said support in a position to control an order of said differential mechanism when said support is in the other of said effective positions, normally inoperable means to move said support to either of its effective positions, and means conditioned by said traveling carriage upon movement of the latter to a predetermined position from one direction to render said support-moving means operable by said driving means to move said support to one of said effective positions in a cycle of operation of the machine, said means being also conditioned by said carriage upon movement of the latter to said predetermined positions from the opposite direction to render said support moving means operable by said driving means to move said support to the other of said effective positions in a cycle of operation of the machine.

4. In an accounting machine having means to drive it through cycles of operation, calculating mechanism, printing mechanism, manipulative amount setting means, a plural order differential mechanism controlled in a machine cycle by said amount setting means to enter amounts set on the latter into said calculating and printing mechanisms, and a traveling paper carriage, the combination of a plurality of control elements, a support for said control elements mounted for movement from a normal position in a first direction to select different ones of said control elements and in a second direction to place the selected control elements in controlling position in relation to parts of said differential mechanism, a part driven from said driving means in a cycle of operation of the machine, means operable by said driven part to move said support in each of said directions, means normally restraining said support moving means from moving said support in either direction but variably adjustable in a plurality of ways to permit movement of said support in said second direction and to control movement of said support in said first direction, a control device on said carriage, a control means variably conditionable by said control device upon movement of the carriage to a predetermined position in a plurality of ways, and connections controlled by said control means to variably adjust said restraining means.

5. In an accounting machine having means to drive it through cycles of operation, calculating mechanism, printing mechanism, manipulative amount setting means, and a plural order differential mechanism controlled in a machine cycle by said amount setting means to enter amounts determined by the latter into said calculating and printing mechanisms, the combination of a support mounted for movement from an ineffective position to an effective position and reversely, at least one control member secured on said support in a selected position thereon for movement therewith to a position to control the extent of operation of said differential mechanism in at least one order thereof in accordance with the selected position of said control member on said support when said support is in said effective position, a member driven by the machine cycling drive means in each cycle of operation of the machine, means operable by said driven member to move said support with the control member thereon to its effective position to cause said member to control said differential mechanism to enter a predetermined amount into said calculating and printing mechanisms and to return said support to ineffective position in a cycle of operation of the machine, normally ineffective means to disable said support-moving means for moving said support from normal position, means controlled by said manipulative amount setting means to render said disabling means effective when an amount is set on said amount setting means and adjustable securing means to secure said control member on said support in any one of a plurality of selected positions thereon to thereby determine the extent of operation of said order of differential mechanism in cycles of operation of the machine in which said support is moved to said effective position.

6. In an accounting machine having means to drive it through cycles of operation, calculating mechanism, printing mechanism, manipulative amount setting means, a plural order differential mechanism controlled in a machine cycle by said amount setting means to enter amounts determined by the latter into said calculating and printing mechanism, means to restore said amount setting means to normal cleared condition after operation of said calculating and printing mechanism in each cycle of operation of the machine, and a traveling paper carriage, the combination of a support mounted for movement from an ineffective position to an effective position and reversely, a plurality of members adjustably mounted on said support in selected positions to control a plurality of orders of said differential mechanism when said support is in said effective position, a plurality of members driven by the machine driving means in a cycle of operation of the machine, means operable by one of said driven members to move said support to its effective position to cause said members to control said differential mechanism to enter a predetermined amount into said calculating and printing mechanisms and to return said support to ineffective position in a cycle of operation of the machine, a manipulative member, means controlled by said carriage and by one of said driven members to hold said manipulative member, when manipulated with the carriage in a first predetermined columnar position, in such manipulated condition through a cycle of operation of the machine performed with said carriage in said first predetermined columnar position and through at least a portion of a cycle of operation of the machine performed with said carriage in a second predetermined columnar position, a further carriage-controlled means, and a means controlled jointly by said manipulative member and the last-mentioned carriage-controlled means to prevent operation of said support-moving means while said carriage is in said first predetermined columnar position and to permit operation of said support-moving means when said manipulative member is held in said manipulated condition in a cycle of operation of the machine while said carriage is in said second predetermined columnar position.

7. In an accounting machine having means to drive it through cycles of operation, calculating mechanism, printing mechanism, manipulative amount setting means, a plural order differential mechanism controlled in a machine cycle by said amount setting means to enter amounts set on the latter into said calculating and printing mechanism, means to restore said amount setting means to normal cleared condition after operation of said calculating and printing mechanism in each cycle of operation of the machine, and a traveling paper carriage, the combination of a support mounted for movement from an ineffective position to an effective position and reversely, a plurality of members adjustably mounted on said support in selected positions to control a plurality of orders of said differential mechanism when said support is in said effective position, a plurality of members driven by the machine driving means in a cycle of operation of the machine, means operable by one of said driven members to move said support to its effective position to cause said members to control said differential mechanism to enter a predetermined amount into said calculating and printing mechanisms and to return said support to ineffective position in a cycle of operation of the machine, a first means to disable said support-moving means from moving said support from normal positions, means controlled by said carriage to render said first disabling means effective when said carriage is in a first predetermined columnar position and effective when said carriage is in a second predetermined columnar position, a second means to disable said support-moving means for moving said support from normal position, means controlled by said manipulative amount setting means to render said second disabling means effective when an amount is set on said amount setting means and ineffective when no amount is set on said amount setting means, a normally effective third means to disable said support-moving means from moving said support from normal position, a manipulative member, means controlled by said amount setting means and operable by said manipulative member only when an amount is set on said amount setting means to place said third disabling means in ineffective position, means to retain said third disabling means in ineffective postion, means operable by one of said driven members in a machine cycle to trip said retaining means in the latter part of a machine cycle, and means controlled by said carriage to disable said tripping means in a machine cycle performed when said carriage is in said first predetermined columnar position.

ARTHUR J. FETTIG.

References Cited in the file of this patent
UNITED STATES PATENTS

| Number | Name | Date |
|---|---|---|
| 1,157,465 | Vincent | Oct. 19, 1915 |
| 1,758,861 | Shipley | May 13, 1930 |
| 2,052,604 | Christian et al. | Sept. 1, 1936 |
| 2,347,607 | Muller | Apr. 25, 1944 |